US008539463B2

(12) United States Patent
De et al.

(10) Patent No.: US 8,539,463 B2
(45) Date of Patent: Sep. 17, 2013

(54) APPARATUS AND METHOD FOR IMPROVING THE PERFORMANCE OF COMPILERS AND INTERPRETERS OF HIGH LEVEL PROGRAMMING LANGUAGES

(75) Inventors: Subrato K. De, San Diego, CA (US); Dineel D. Sule, San Diego, CA (US); Kun Zhang, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 306 days.

(21) Appl. No.: 13/193,360

(22) Filed: Jul. 28, 2011

(65) Prior Publication Data
US 2013/0031536 A1 Jan. 31, 2013

(51) Int. Cl.
*G06F 9/45* (2006.01)

(52) U.S. Cl.
USPC .......................................... 717/146

(58) Field of Classification Search
USPC .......................................... 717/146
See application file for complete search history.

(56) References Cited

U.S. PATENT DOCUMENTS

| 6,070,009 | A | 5/2000 | Dean et al. | |
|---|---|---|---|---|
| 6,170,083 | B1 | 1/2001 | Adl-Tabatabai | |
| 6,594,761 | B1 * | 7/2003 | Chow et al. | 713/190 |
| 6,964,043 | B2 | 11/2005 | Wu et al. | |
| 7,493,610 | B1 | 2/2009 | Onodera et al. | |
| 8,024,708 | B2 * | 9/2011 | Demetriou et al. | 717/124 |
| 2010/0199257 | A1 * | 8/2010 | Biggerstaff | 717/104 |

OTHER PUBLICATIONS

Anderson, O., et al., "Checked Load: Architectural Support for JavaScript Type-Checking on Moblie Processors", Feb. 12-16, 2010, p. 16 Published in: US.
Arnold, M., et al., "A Survey of Adaptive Optimization in Virtual Machines", Proceedings of the IEEE downloaded Dec. 11, 2008, Feb. 2005, pp. 449-466, vol. 93, No. 2, Publisher: IEEE, Published in: US.
Chambers, C., et al., "Customization: Optimizing Compiler Technology for SELF, a Dynamically-Typed Object-Oriented Programming Language", Jul. 1989, pp. 146-160, Publisher: ACM, Published in: US.
Ertl, M.A., et al., "Super instructions and Replication in the Cacao JVM interpreter", .NET Technologies, May 31, 2006, p. 10 Published in: CZ.
Gal, A., et al., "Trace-based Just-in-Time Type Specialization for Dynamic Languages", Proceedings of the ACM SIGPLAN 2009 Conference on Programming Language Design and Implementation, May 28, 2009, p. 16 Publisher: ACM, Published in: Dublin, IE.

(Continued)

*Primary Examiner* — John Chavis
(74) *Attorney, Agent, or Firm* — Neugeboren O'Dowd PC

(57) ABSTRACT

A content processing device and corresponding method are disclosed. The content processing device includes a compiler front end to parse programming language source code into an high level intermediate representation and a detection component to detect high level constructs in the intermediate representation of the source code that satisfy constraints for parallel-merging high level constructs. And a parallel-merging component modifies the high level intermediate representation of the source code by parallel-merging the detected constructs to generate new high level parallel-merged constructs in a modified high-level intermediate representation of the source code that enable runtime operations of the detected constructs when finally lowered into processor instructions to be able to execute in parallel using the executable code generated from the modified intermediate representation.

48 Claims, 24 Drawing Sheets

(56) References Cited

OTHER PUBLICATIONS

Ha J., et al., "A Concurrent Trace-based Just-In-Time Compiler for JavaScript", Mar. 18, 2009, p. 11 Published in: US.

Holzle, U., et al., "Adaptive Optimization for SELF: Reconciling High Performance with Exploratory Programming", A Dissertation Submitted to the Department of Computer Science and the Committee on Graduate Studies, Aug. 1994, p. 181 Publisher: Stanford U., Published in: US.

Holzle, U., et al., "Optimizing Dynamically-Dispatched Calls with Run-Time Type Feedback", Proceedings of the ACM SIGPLAN 1994 Conference on Programming Language Design and Implementation, Jun. 1994, pp. 326-336, Publisher: ACM, Published in: Orlando, FL.

Holzle, U., et al., "Optimizing Dynamically-Typed Object-Oriented Languages With Polymorphic Inline Caches", ECOOP '91 Proceedings, Springer Verlag Lecture Notes in Computer Science 512, Jul. 1991, pp. 1-18, Published in: US.

Mehrara, M., et al., "Dynamically Accelerating Client-side Web Applications through Decoupled Execution", Sep. 28, 2010, p. 12 Publisher: Semiconductor Research Corporation, Published in: US.

Paleczny, M., et al., "The Java HotSpot Server Compiler", Proceedings of the Java Virtual Machine Research and Technology Symposium (JVM '01), Apr. 23-24, 2001, p. 13 Publisher: Sun Microsystems, USENIX Association, Published in: Monterey, CA.

Richards, G., et al., "An Analysis of the Dynamic Behavior of JavaScript Programs", Proceedings of the Conference on Programming Language Design and Implementation, Jun. 5-10, 2010, p. 12 Publisher: ACM, Published in: Toronto, ON.

"V8 JavaScript Engine", Webpage found at http://code.google.com/p/v8 downloaded Jan. 4, 2013, 2008, p. 2 Publisher: Google, Inc., Published in: US.

* cited by examiner

CONSECUTIVE PROPERTY READS ON THE SAME OBJECT
( .... = obj.x ; ..... = obj.y )
- For any intermediate property writes, a fail-safety 'object layout' changes is supported LOADING CONSECUTIVE JAVASCRIPT ARRAY ELEMENTS
(..... = x[0]; ..... = x[1]; ..... = x[2])
- For any array element writes in between a fail-safety check for possible aliasing and possible type change is supported CONSECUTIVE PROPERTY READS ON DIFFERENT OBJECT where previous accesses indicated both as same typed e.g., double precision FP, or integer, or string ( ...... = obj1.x; ..... = obj2.y)
- Fail safety for possible 'type difference' is supported.

CONSECUTIVE PROPERTY STORES ON THE SAME OBJECT,
( obj.x = ....; obj.y = .....)
- with additional condition check that the object layout does not change by any of the immediate previous property writes STORING CONSECUTIVE JAVASCRIPT ARRAY ELEMENTS
(x[0] = .... ; x[1] = ... ; x[2] = ....)
- with additional condition check for possible aliasing and possible type change is supported PROFILE GUIDED CONSECUTIVE PROPERTY READS ON DIFFERENT OBJECT indicating same runtime control flow path
- A mechanism to record the control flow path, which may record the offset of the branch instructions from the first instruction in a particular CFR as a signature <offset1, offset2, offset3,...., offsetN>
- If the signatures of the consecutive equivalent CFRs match for a certain number of times, perform the optimization but handle the fail-safety.

FIG. 6

APPARATUS AND METHOD FOR IMPROVING THE PERFORMANCE OF COMPILERS AND INTERPRETERS OF HIGH LEVEL PROGRAMMING LANGUAGES

BACKGROUND

1. Field

The present invention relates to computing devices. In particular, but not by way of limitation, the present invention relates to compiling or interpreting scripting code.

2. Background

More and more websites are utilizing source code constructs that are written in high level programming languages that must be compiled or interpreted before many other activities (e.g., layout calculations, rendering) associated with the constructs can be executed. By way of example, ECMAscript-based scripting languages (e.g., JavaScript or Flash) are frequently used in connection with the content that they host. More specifically, JavaScript-based content is ubiquitous, and JavaScripts are run by a JavaScript engine that may be realized by a variety of technologies including interpretation-type engines, HotSpot just-in-time (JIT) compilation (e.g., trace based or function based), and traditional-function-based JIT compilation where native code is generated for the entire body of all the functions that get executed.

Compilation and interpretation of source code constructs, however, is often a processor-intensive process that may adversely affect a user's experience (due to the time it takes to compile or interpret the source code). The HotSpot JITs employ two known approaches to reduce the time it takes to process source code constructs and improve a user's experience: (i) the less frequently executed code is interpreted, and the most frequently executed code is compiled to native code; or (ii) a lightweight and less optimized compilation is carried out for less frequently executed code, and a heavy and optimized compilation is carried out for the most frequently executed code.

Interpretation directly involves running code over a software layer, called an interpreter, which handles the execution of the code by mapping operations to native code functions implemented in native processor ISA and that runs on processor hardware. Because pure interpretation is slow, most of the current JavaScript engines (e.g., JSC/Nitro, V8, Tracemonkey, and the IE9 JavaScript engine) used in browsers are using one form of the JIT technology or the other.

JIT-based engines compile the scripts at runtime to native code, and then the native code is executed on the processor hardware. As a consequence, a browser that uses a JIT-based JavaScript engine compiles and executes each piece of script code as soon as the code is found while parsing the HTML file. And in general, evaluation of scripts forms a large part of browser's overall page load time. For example, if networking delays are not considered, 30% of the page load time may be due to the evaluation of JavaScripts. For a traditional function based JIT JavaScript engine, one-third of the evaluation time for a JavaScript may be due to compilation and the remainder due to execution of the compiled code.

Performance of existing JIT compilers for JavaScript and other dynamically typed languages is still much lower than the compilers for statically typed languages because of the extensive type checking and object layout validation checks that need to be performed. Moreover, languages in addition to dynamically typed scripting languages may have other runtime condition checks built into the high level constructs that slow execution. For example, automatic array-bounds checks and null-pointer checks for the statically typed language Java are processing activities that slow the execution of Java-based constructs.

Although current compilers use type specialization and inline caching, there are many instances where accurate type inference cannot be done; thus these techniques are not always able to improve performance suitably, and even when these techniques are performed, additional improvements in performance are still desirable, particularly for multi-issue superscalar RISC processors, VLIW processors, and processors with SIMD and supporting vectorization.

SUMMARY

Some aspects of the present invention include a content processing device that includes a compiler front end to parse source code into a high level intermediate representation of the source code, a detection component to detect high level constructs in the high level intermediate representation of the source code that satisfy constraints for parallel-merging high level constructs, and a parallel-merging component that modifies the high level intermediate representation of the source code. The parallel-merging component modifies the high level intermediate representation of the source code by parallel-merging the detected constructs to generate new parallel-merged constructs in a modified high level intermediate representation of the source code that enable runtime operations of the detected constructs to execute in parallel using executable code generated from the modified high level intermediate representation. And if the parallel execution of the runtime operations causes an error, execution is carried out using executable code generated from unmodified representations of the detected constructs so the operations of the detected constructs execute sequentially during runtime.

Other aspects of the present invention include a method for processing source code including receiving source code, parsing the source code to obtain a high level intermediate representation of the source code, detecting constructs in the high level intermediate representation of the source code that satisfy constraints for parallel-merging high level constructs, and parallel-merging the high level constructs to generate new high level parallel-merged constructs in a modified high level intermediate representation of the source code that enable runtime operations of the detected constructs to execute in parallel using executable code generated from the modified high level intermediate representation. And if the parallel execution of the runtime operations causes an error, executable code generated from unmodified representations of the detected high level constructs is executed so the operations of the detected constructs execute sequentially during runtime.

BRIEF DESCRIPTION OF THE DRAWINGS

FIG. 6 is a list of context types that may be included in the library of known context types depicted in FIG. 1 where a context type identifies a set of specific high level constructs with their connectivity pattern and constraints and defines the signature of a parallel-merge candidate;

DETAILED DESCRIPTION

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

The word "exemplary" is used herein to mean "serving as an example, instance, or illustration." Any embodiment described herein as "exemplary" is not necessarily to be construed as preferred or advantageous over other embodiments.

Figure 1:
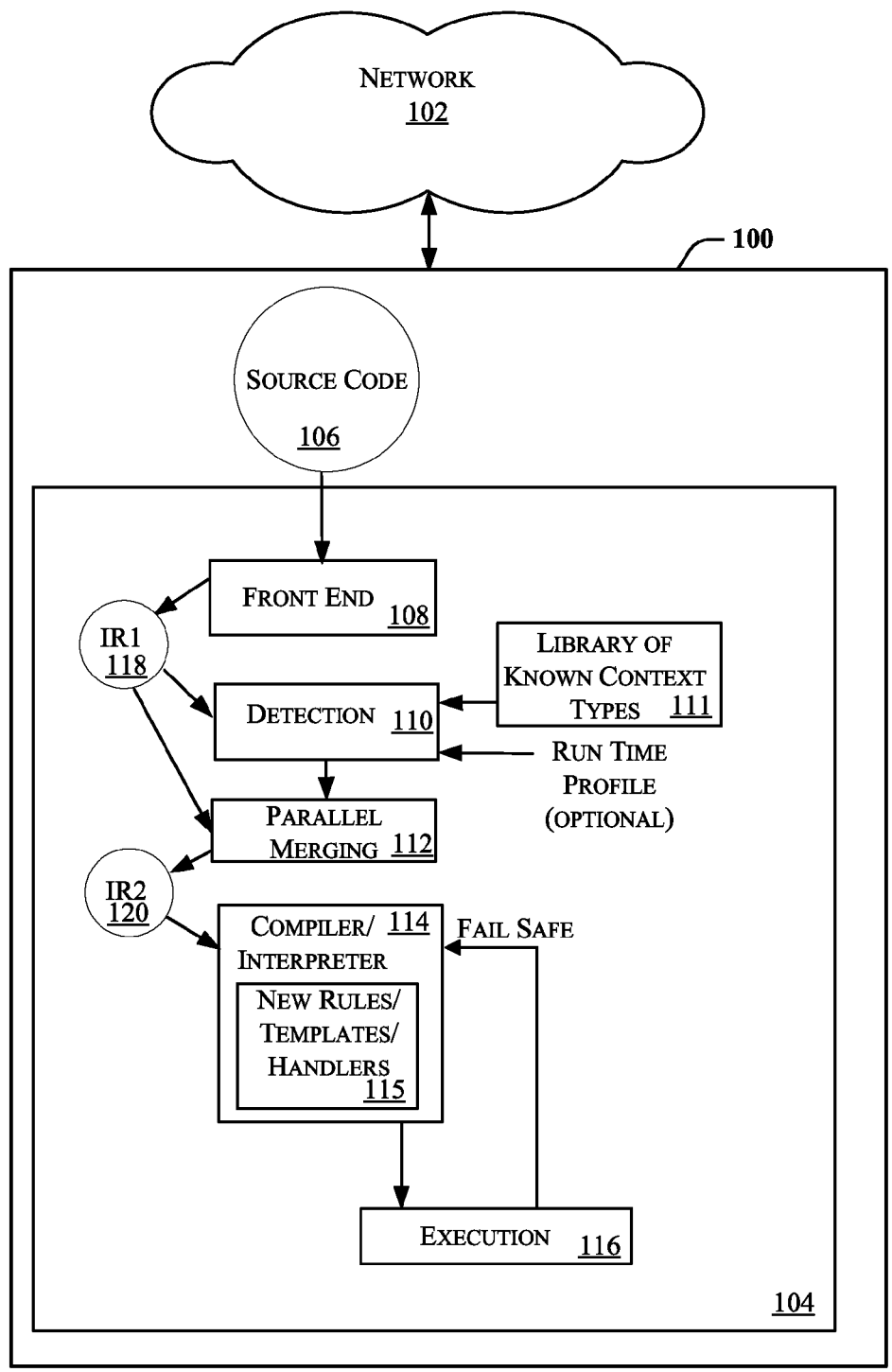
FIG. 1 is a block diagram of an exemplary communication device.

Referring to FIG. 1, shown is a block diagram depicting an exemplary communication device 100 in which many embodiments of the present invention may be implemented. As shown, the communication device 100 is generally configured to communicate via a network 102 to remote web servers or proxy servers (not shown) to receive and display content (e.g., webpages) for a user of the communication device 100. The communication device 100 may be realized by a wireless communications device (WCD) such as a smartphone, PDA, netbook, tablet, laptop computer and other wireless devices. But the communication device 100 may work in tandem with wireline and wireless communication devices. The network 102 may include the Internet, local area networks, cellular networks (e.g., CDMA, GPRS, and UMTS networks), WiFi networks, and other types of communication networks.

As depicted, the communication device 100 in this embodiment includes a virtual machine 104 that is disposed to receive and process source code 106 so the instructions embodied in the source code 106 may be executed more quickly than prior art virtual machines. More specifically, the source code 106 is code written in a programming language, which generates complex control flow regions (CFRs) in the low level machine operations from basic high level language constructs that are ordinarily time consuming to execute. And embodiments of the virtual machine 104 increase the performance of an interpreter or compiler (e.g., JIT compiler) that takes the source code 106 by parallel-merging high level constructs in the high level intermediate representation that are the same in structure and function and would take the same control flow path at runtime and that would otherwise, without aspects of this invention, be consecutively executed during runtime. Also performed in connection with one or more embodiments are other types of detection and parallel-merging on two or more different high level constructs (i) which when lowered expand to pure linear code (e.g., a basic block (BB)); (ii) where one of them when lowered generates a CFR and the others when lowered are pure linear code (e.g., a BB), where the BB for them gets merged to the most frequently taken CF in the CFR, and needs the fail-safe error correction; and (iii) those when lowered includes a distinct straight line sequential code in their CFRs, where the distinct straight line sequences form the regions that are parallel-merged.

In this context, control flow refers to the order in which the individual statements, instructions, or function calls of a computer program are executed or evaluated. The types of source code 106 that may benefit from the virtual machine 104 include dynamically typed scripting languages including ECMAscript-based scripting language (e.g., JavaScript) and statically typed languages such as Java that may have other runtime condition checks built into the high level constructs. For example, Java includes automatic array-bounds checks and null-pointer checks that are generated from relatively simple high level constructs. Many dynamically typed languages like LISP, SELF, Python, Perl, ActionScript also may have high level constructs for type checking. And even for statically typed programming languages such as C/C++ and similar languages, consecutive replicated calls to the same function with different parameters can be considered as equivalent to high level constructs discussed in this disclosure that could be detected and parallel-merged in a parallel-merged-function that internally implements the error handling safeguards if failure occurs.

Figure 2:
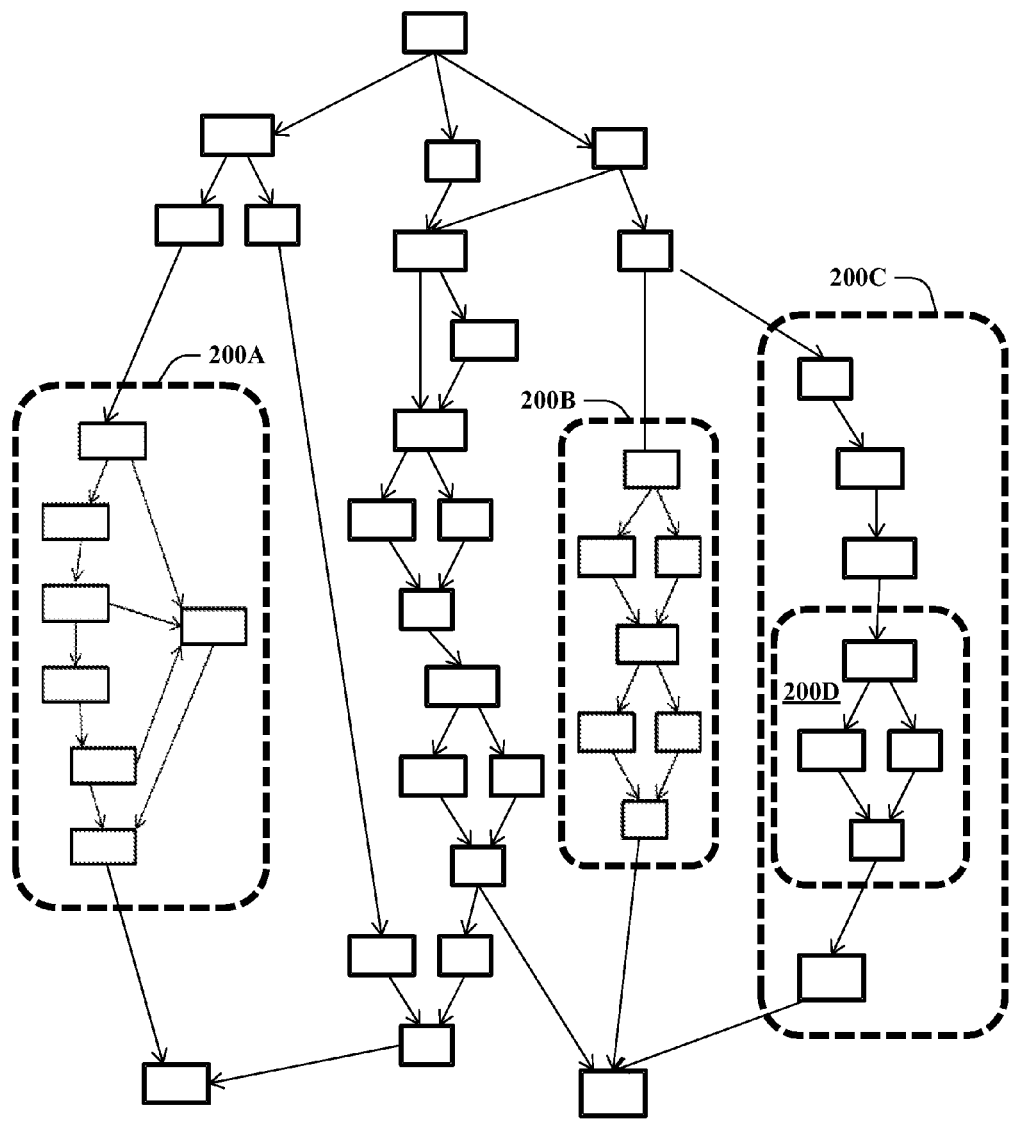
FIG. 2 is a representation of a generic control flow graph.
Figure 9:
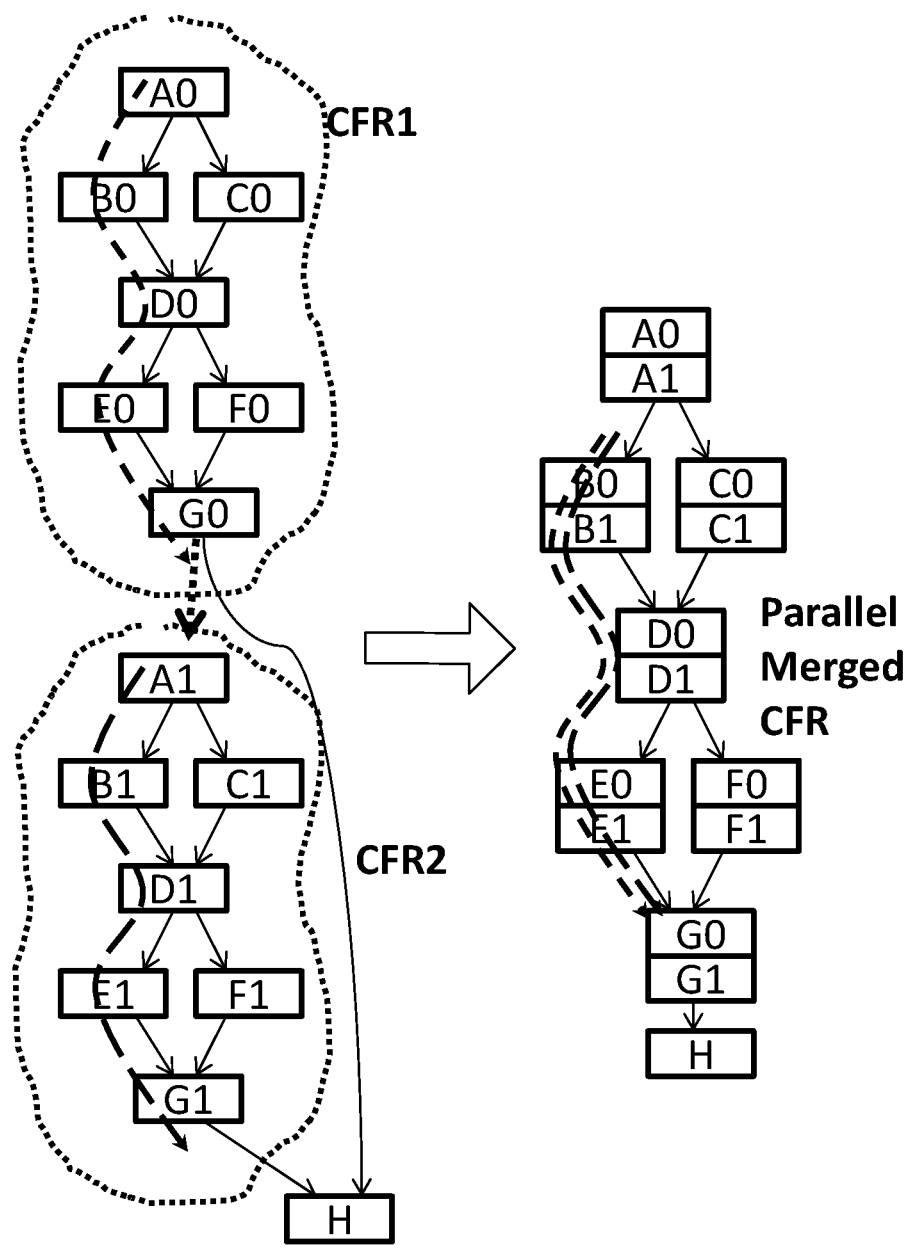
FIG. 9 depicts the difference between consecutively executed SESE CFRs and parallel-merged form of the consecutively executed SESE CFRs.

Referring to FIG. 2, shown is a representation of a generic control flow graph (CFG), which is a representation, using graph notation, of all paths that might be traversed through a program during its execution. A control flow graph may be characterized in terms of a set of vertices, called basic blocks, and a set of edges connecting these basic blocks. Every basic block contains a list of statements. The execution of a function is defined as a walk over the CFG, where every time a basic block is passed its statements are executed in linear order. A control flow region (CFR) is a connected subgraph of a CFG, and a CFR that has only two connections to the CFG (an incoming and an outgoing edge) as part of a single-entry-single-exit region (SESE) is known as an SESE CFR. Shown in FIG. 2 are four SESE CFRs 200A, 200B, 200C, and 200D. As discussed further herein, the exemplary virtual machine 104 performs inter-SESE-CFR parallel-merging so that when viable, two or more SESE CFRs are executed in parallel during runtime. In general, parallel-merging is a technique where two or more nodes (that represent high level constructs) of the high level intermediate representation (HLIR) are combined into a single node in the HLIR, such that during the lowering of the HLIR to the low level intermediate representation (LLIR) there is an increase in the low level machine like operations in each edge of the merged CFR through gradual mixing of low level operations from the individual unmerged CFRs of the two or more HLIR nodes that got merged. This enables parallel execution of the low level operations originally from the different high level constructs that are parallel-merged. FIG. 9 shows CFR1 and CFR2 in the LLIR form for two HLIR nodes before merging, and also shows the parallel-merged CFR in the LLIR form for the parallel-merged HLIR node. As shown, the low level operations in each control flow path in CFR1 (e.g., B0) and CFR2 (e.g., B1) are grouped together in the parallel merged CFR (B0, B1). Similarly C0, E0, F0 in different control flow paths in CFR1 and C1, E1, F1 in different control flow paths in CFR2, respectively gets merged as (C0, C1), (E0, E1), (F0, F1) in the control flow paths in the parallel-merged CFR, and thus, execute in parallel during runtime.

A high level intermediate representation maintains the atomic constructs of the programming language (e.g., property read/writes, array read/writes, JavaScript binary operations with in-built type checking) as atomic components (particularly as a single node) in the intermediate representation. Thus the HLIR is an intermediate representation that maintains the constructs and features of the input programming language. A low level intermediate representation breaks down the high-level atomic programming constructs of the input programming language into simple operations that closely resemble the instructions of the hardware machine. As an example, a JavaScript array read operation that is present as a single node in the HLIR generated from the input JavaScript language would be lowered to a control flow region in the low level intermediate representation and would include low level operations like Load, Store, Compare, branch, Add, etc. that closely resemble the instructions of the hardware machine.

In contrast to the inter-SESE-CFR optimization performed by many embodiments disclosed herein, typical prior compilers focus on intra-SESE-CFR optimization by locally optimizing an individual construct generated from a single high-level-language (HLL) construct. For example, prior art compilers are known to optimize a commonly taken path and ensure the execution in the common path is improved to be fast enough (hence this approach is often referred to as a "fast-path" in common JIT compiler terminology). But embodiments of the present invention operate beyond a single HLL construct to find a group of proximately-located HLL constructs (e.g., two or more constructs) that are the same (and hence, generate the same SESE CFR when lowered to the low level intermediate representation), or in certain cases the group can include different HLL constructs such that when lowered at least all constructs except one have a predominant basic block (BB) in the low level intermediate representation through which control flow must pass, and the group of HLL constructs are collectively optimized together by parallel-merging them.

Referring again to FIG. 1, the virtual machine 104 in this embodiment includes a compiler front end 108, a detection component 110, a library of known context types 111 where each of the context types identify sets of specific HL constructs with their connectivity pattern and constraints that define the signature of a parallel-merge candidate. Also depicted are a parallel merging component 112, a compiler/interpreter 114, and an execution component 116. And each of the compiler front end 108, detection component 110 and the merging component 112 are in communication with a first intermediate representation 118, and the parallel merging component 112 and the compiler/interpreter 114 are both in communication with a modified intermediate representation 120.

In addition, the compiler/interpreter 114 includes new rules/templates/handlers 115. The new rules (for optimized compilers) or templates (for un-optimized compilers) or handlers (for interpreters), for lowering the parallel-merged high level constructs from the high level intermediate representation to low level intermediate representation (for optimized compilers) or direct assembly code (for un-optimized compilers) or interpreter engine formatted code (for interpreters) that leads to the final efficiency and the correctness of the improved execution. The new rules for a particular parallel-merged high level construct generate the parallel merged control flow region by doing one-by-one aggregation of the low level operations leading to the presence of multiple same low level operations in the low level intermediate representation (or same assembly instructions in assembly code) side by side as equal to the number of similar high level constructs that are parallel-merged.

The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system.

Figure 3:
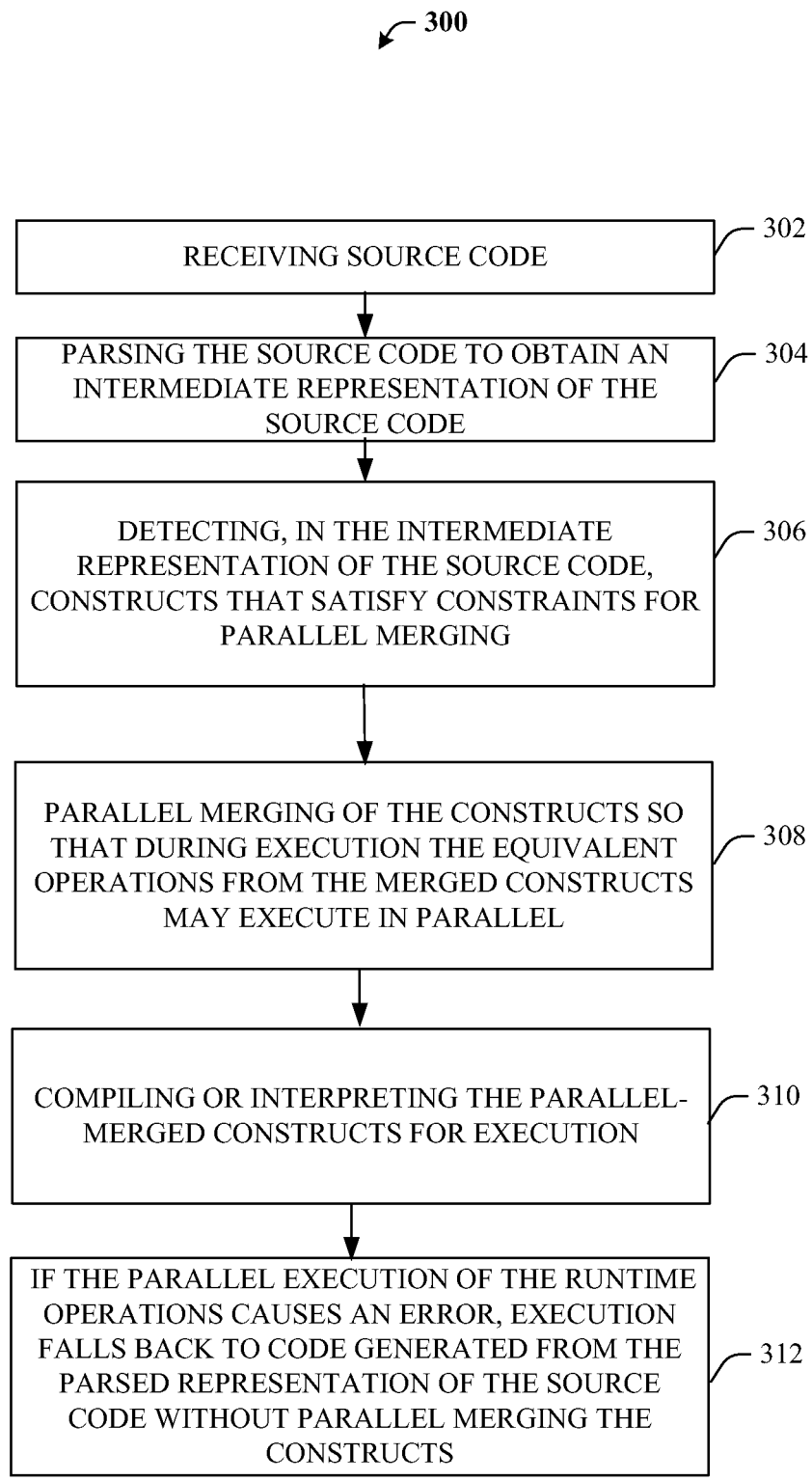
FIG. 3 is a flowchart depicting an exemplary method.
Figure 4:
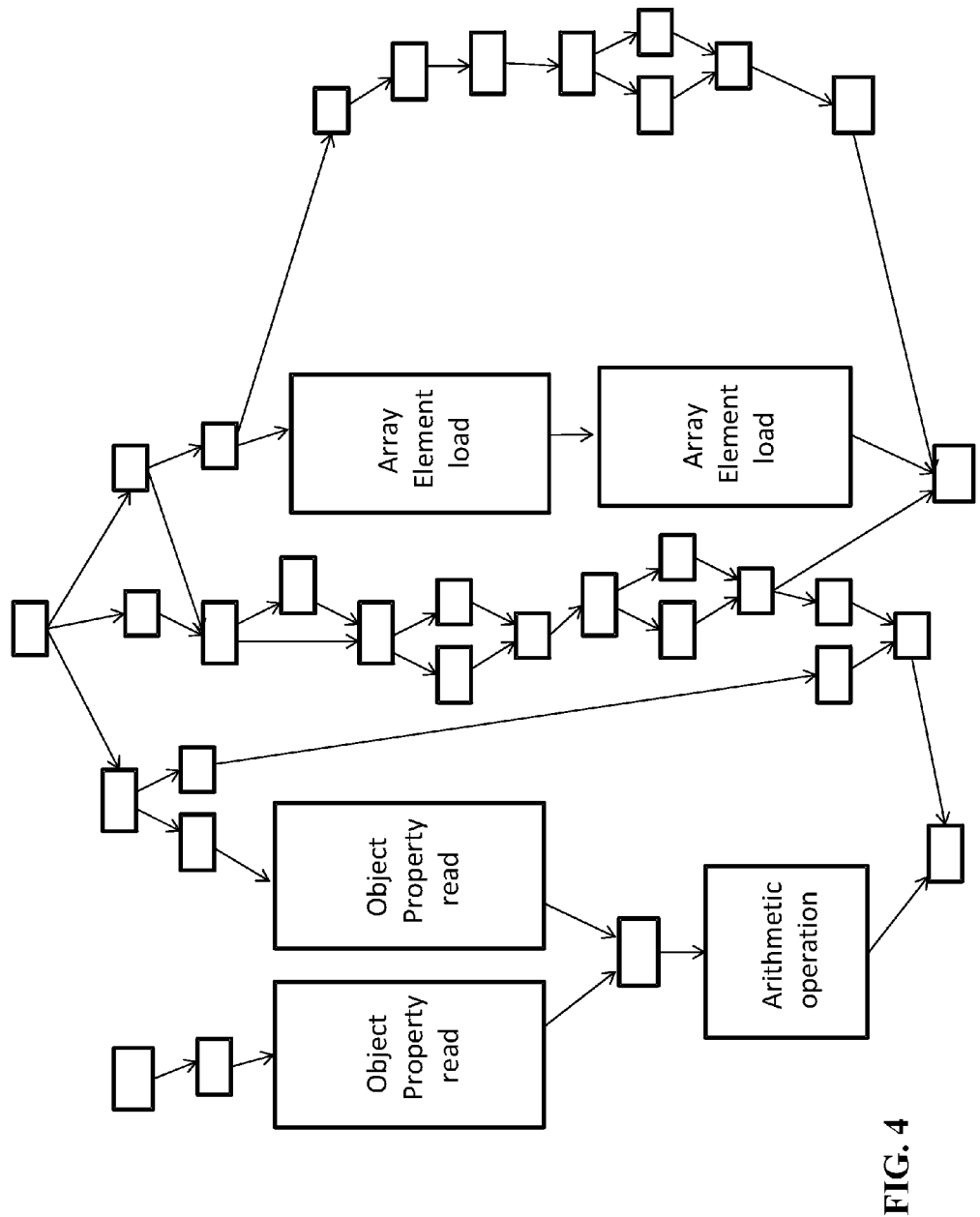
FIG. 4 depicts an intermediate representation of code produced by parsing source code.

While referring to FIG. 1, simultaneous reference is made to FIG. 3, which is a flowchart 300 depicting a method that may be carried out in connection with the embodiment depicted in FIG. 1. As shown, the compiler front end 108 receives source code 106 (Block 302), and the compiler front end 108 parses the source code 106 into the first intermediate representation 118 of the source code 106 (Block 304). Referring briefly to FIG. 4 for example, shown is an exemplary depiction of a high level intermediate representation of code (e.g., an abstract syntax tree or control flow graph) produced by parsing the source code 106. As shown, within this intermediate representation of code, there are JavaScript specific high-level operation nodes including "object property read," operation nodes "array element load" operation nodes, and a JavaScript "arithmetic operation" node.

In general, the first intermediate representation 118 of the source code 106 is in the form of a high-level intermediate representation (HLIR) of the source code 106. For example, the first intermediate representation 118 of the source code may be an abstract syntax tree (AST) or a control flow graph (CFG) (e.g., such as the example depicted in FIG. 2). An AST is a tree representation of the abstract syntactic structure of source code written in a programming language. Each node of the tree denotes a construct occurring in the source code. The syntax is "abstract" in the sense that it does not represent every detail that appears in the real syntax. For instance, grouping parentheses are implicit in the tree structure, and a syntactic construct such as an if-condition-then expression may be denoted by a single node with two branches. Although the intermediate representation of source code that is discussed throughout this disclosure is often an AST or CFG, it is certainly contemplated that other types of intermediate representations of source code may be utilized without departing from the scope of the embodiments described herein.

Figure 19A:
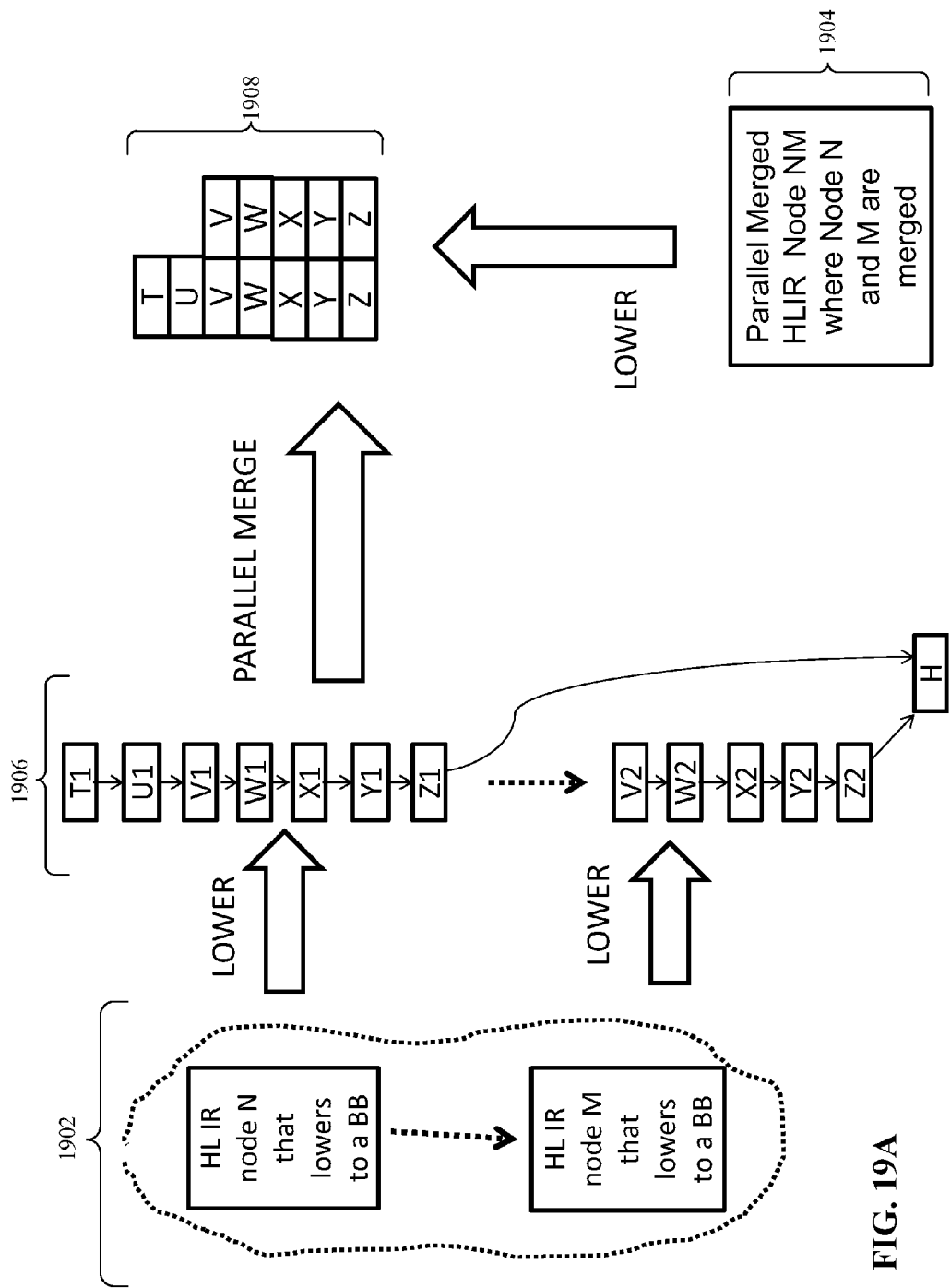
FIG. 19A is diagram that shows detection and parallel merging of two or more different high level constructs, which when lowered, individually expand to pure linear code.

Referring again to FIGS. 1 and 3, the detection component 110 accesses the first intermediate representation of the source code 118 to detect constructs in the first intermediate representation 118 of the source code that satisfy constraints for parallel-merging (Block 306). For example, in some instances detection includes detecting constructs that would be executed consecutively during runtime; are equivalent in structure and function; and have the same SESE control flow path during execution performed in Block 306. But other types of detection and parallel-merging of the constructs in the high level intermediate representation may also be performed in Block 306 and Block 308. For example, Block 306 may also perform detection and block 308 may perform parallel merging as shown in FIG. 19A of two or more different HL constructs, which when lowered, individually expand to pure linear code (e.g., a basic block (BB)).

Figure 19B:
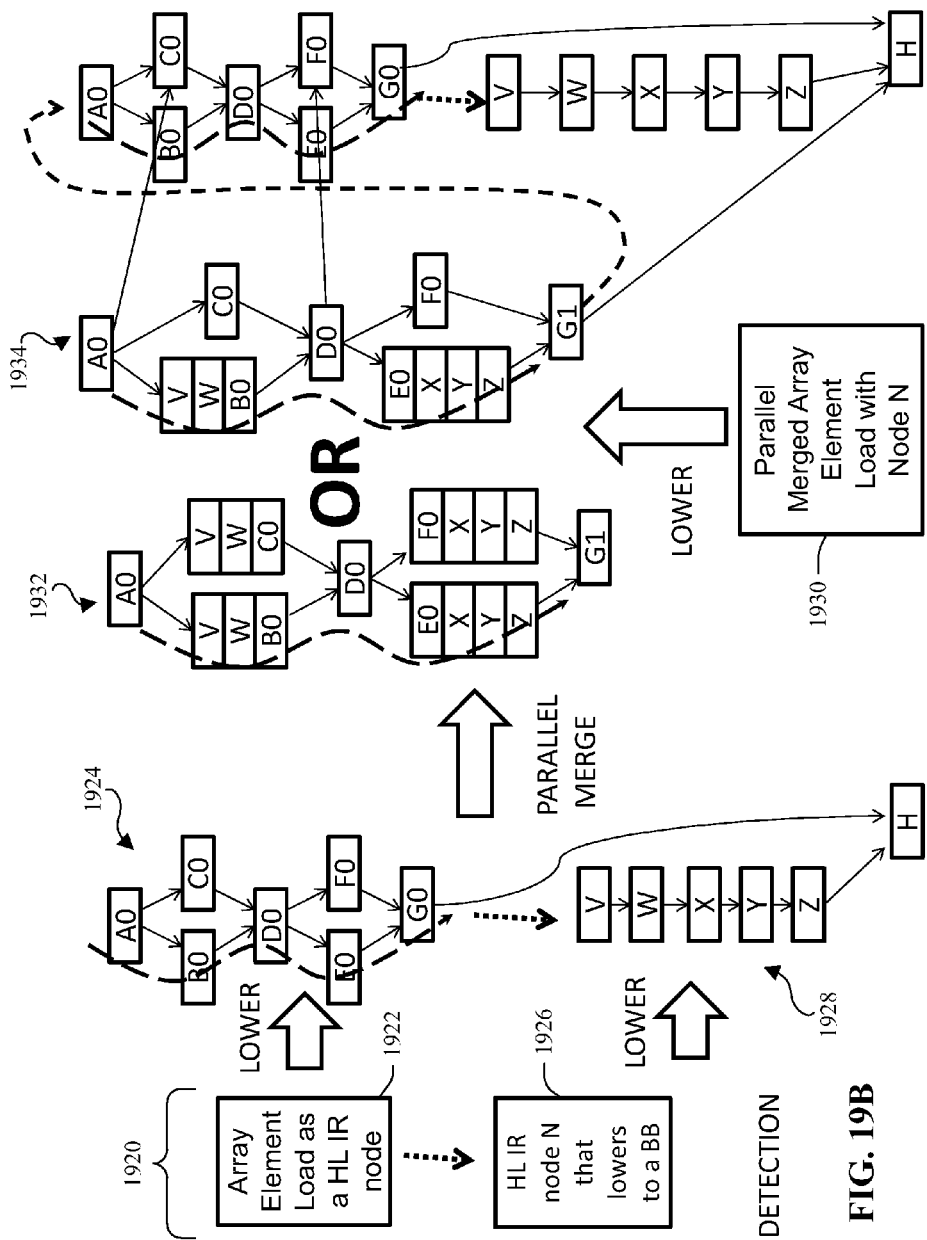
FIG. 19B is a diagram that shows detection and parallel merging of two or more different high level constructs, where one of them when lowered individually generates a CFR and the others when lowered individually generate pure linear code.
Figure 19C:
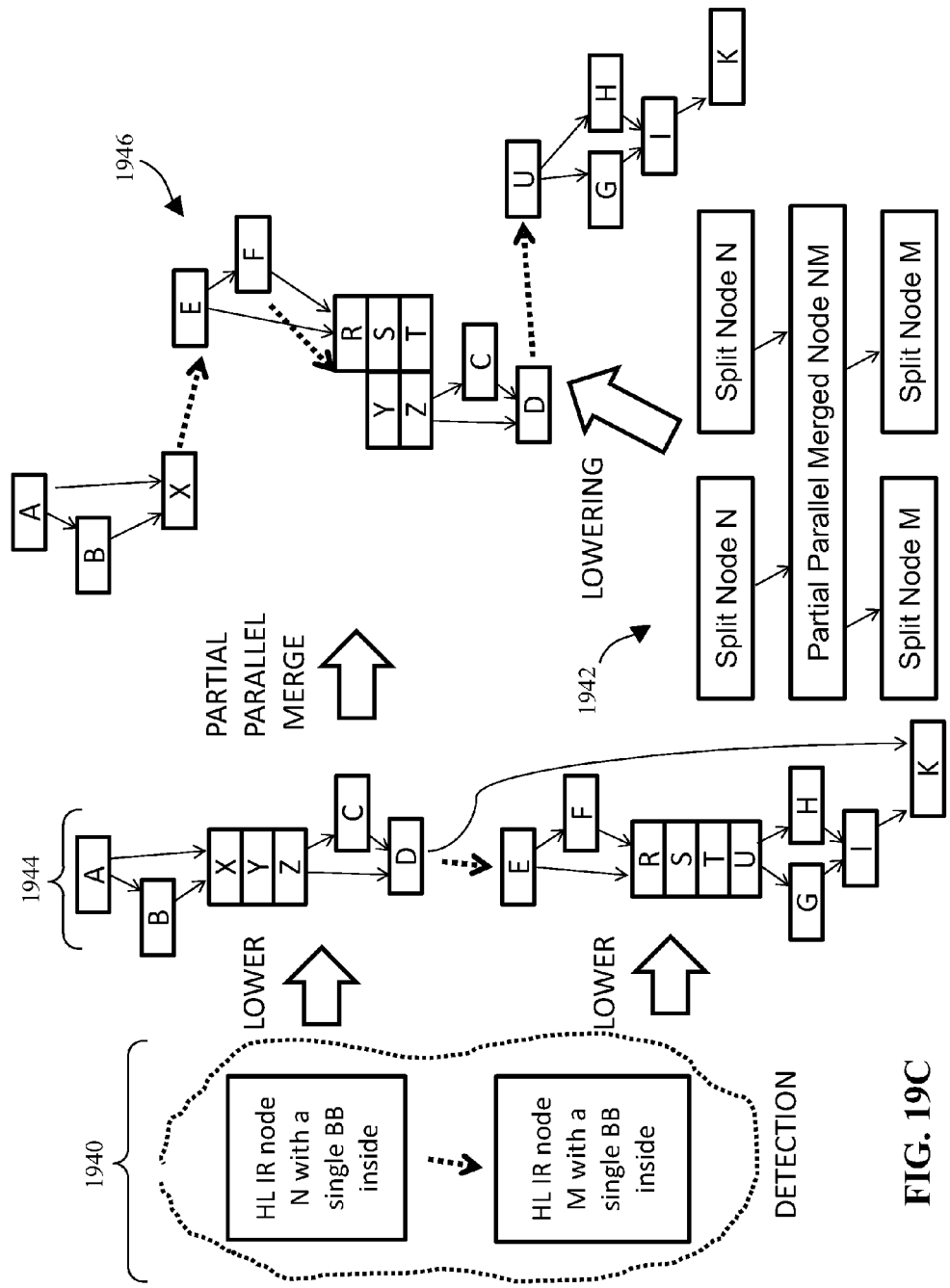
FIG. 19C is a diagram that shows detection of partial constructs and partial parallel merging of two or more different high level constructs.

The detecting (Block 306) and parallel merging (Block 308) may also include respective detection and parallel merging, as shown in FIG. 19B, of two or more different high level constructs, where one of them when lowered individually generates a CFR and the others when lowered individually generate pure linear code (e.g., a BB), where the BB for each of them gets merged to the most frequently taken control flow path in the CFR, and fail-safe error correction support is provided for instances where the most frequently taken control flow path is not taken. In addition, the detecting (Block 306) and parallel merging (Block 308) may also include respective detection and parallel merging, as shown in FIG. 19C, of two or more different high level constructs, which when lowered, include distinct straight line sequential code (a distinct BB) through which control flow path must pass in their CFRs, where the distinct straight line code sequence (BB) form the regions that are parallel-merged, leading to partial parallel-merging of the high-level constructs.

Figure 5:
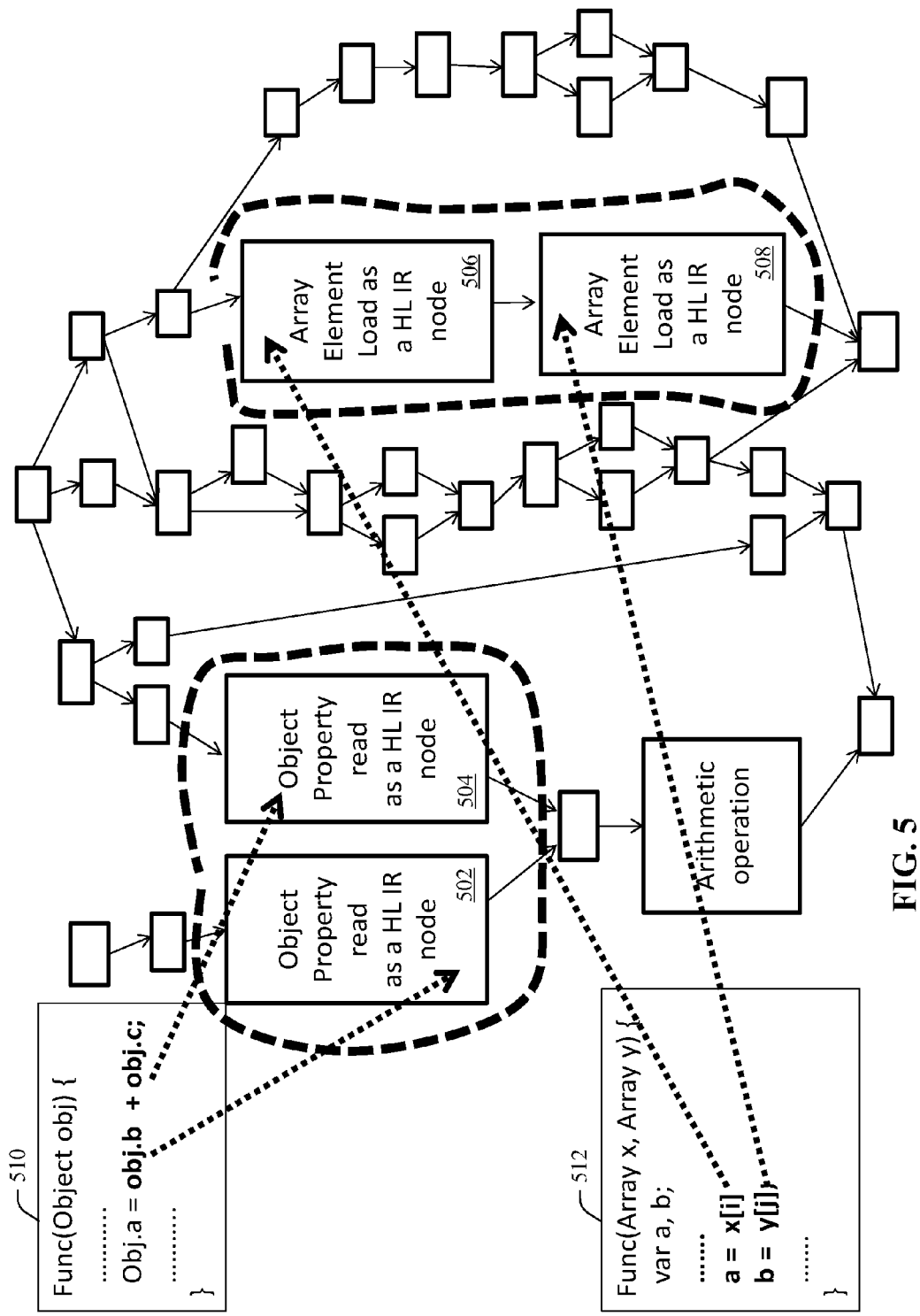
FIG. 5 depicts detection of intermediate representations constructs that may be parallel-merged.

Referring briefly to FIG. 5, for example, depicted are intermediate representations of a first object property read construct 502 and a second object property read construct 504 that are executed consecutively during runtime. And also shown are intermediate representations of a first array element load construct 506 and a second array element load construct 508 that are executed consecutively during runtime. Although the first and second object property read constructs 502, 504 are depicted as parallel nodes in the HL intermediate representation, the lowering phase generates the LLIR sequence for the operations in a sequential fashion and during runtime (after the intermediate representation is lowered, assembled, and converted to executable or interpretable code) the corresponding operations are executed consecutively. The position and connection of the first and second object property read constructs 502, 504 and the first and second array element load constructs 506 and 508 in the HLIR do not invalidate any true dependency and alias dependency constraints if they are parallel-merged; thus the first and second object property read constructs 502, 504, in addition to the first and second array element load constructs 506, 508, are potential candidates for parallel-merging and would not change the functional behavior of the input source code when parallel-merged.

To detect whether a group of HL constructs (e.g., the first and second object property read constructs 502, 504) in the high level first intermediate representation 118 would be a potential candidate for parallel merging, the detection component 110 detects whether the HLIR nodes are sequentially connected or connected in parallel to a common point and whether the connection structure and functional nature of the HL construct satisfies the constraints for parallel-merging. The fundamental constraint of parallel-merging is that the functional behavior and correctness should be maintained, which means the true data-dependencies (read-after-write), the control-dependencies, and the alias-dependencies must be maintained unchanged as it was in the original CFG before parallel merging.

Parallel merging is the process of combining the detected multiple high level constructs represented as nodes in the high-level first intermediate representation 118 in one or more new high level constructs that are represented as new nodes in the high-level modified intermediate representation 120 of the source program. The new node or the nodes generated after parallel merging completely replace the group of detected multiple high level constructs (represented as nodes) in the existing high level first intermediate representation 118 leading to the high level modified intermediate representation 120. If more than one new high-level construct are created as new nodes, it is called partial parallel merging.

Also shown in FIG. 1 are new rules/templates/handlers 115, which include new rules if the compiler/interpreter 114 is realized by an optimized compiler 114, new templates if the compiler/interpreter 114 is realized by a non-optimized compiler, or new handlers if the compiler/interpreter 114 is realized by an interpreter. The new rules (for optimized compilers) or templates (for un-optimized compilers) or handlers (for interpreters) for lowering the parallel-merged high level constructs from the high level intermediate representation to low level intermediate representation (for optimized compilers) or direct assembly code (for un-optimized compilers) or interpreter engine formatted code (for interpreters) leads to the final efficiency and the correctness of the improved execution. The new rules for a particular parallel-merged high level construct generates the parallel merged control flow region by doing one-by-one aggregation of the low level operations (as shown in FIG. 9) leading to the presence of multiple same low level operations in the low level intermediate representation (or same assembly instructions in assembly code) side by side as equal to the number of similar high level constructs parallel-merged Also shown in FIG. 5 are a first source code representation 510 corresponding to both the first object property read construct 502 and the second object property read construct 504. And also shown is a second source code representation 512 that corresponds to both the first array element load construct 506 and the second array element load construct 508.

In several embodiments, the detection component 110 detects constructs in the first high level intermediate representation 118 of the source code 106 that could be parallel-merged and that otherwise without parallel-merging would be executed consecutively during runtime, and in addition, the detection component 110 also detects whether the constructs are equivalent in structure and function, and the detection component 110 detects whether an execution trace through the control flow paths in the constructs is the same. And in many implementations, the detection component 110 also performs other types of detection on two or more different high level constructs (i) which when lowered expand to pure linear code (e.g., a BB); (ii) where one of them when lowered generates a CFR and the others when lowered are pure linear code (BB), where the BB for them gets merged to the most frequently taken control flow path in the CFR, and needs the fail-safe error correction; (iii) those when lowered include distinct straight line sequential code in their CFRs, where the distinct straight line sequences form the regions that are parallel-merged. As depicted in FIG. 1, the detection component 110 uses the library of known context types 111 to facilitate a determination of whether the constraints for parallel-merging can be satisfied. As mentioned before, each context type in the library identifies a set of specific HL constructs with their connectivity pattern and constraints and defines the signature of a parallel-merge candidate.

Beneficially, the high level constructs are directly present as an operation node in the high level first intermediate representation 118, and there is no need to perform complex pattern matching (region extraction methods) and/or control-data-flow graph analysis. The detection component 110 knows about the exact structure and function of a particular HLL construct, and as a consequence, the recognition of consecutive constructs is reduced to finding two or more consecutive HLL operation nodes in the high level first intermediate representation 118; thus detection is lightweight and suitable for JIT compilers.

In the first intermediate representation 118, the high-level constructs that would execute consecutively during runtime could be present in different paths of the graph. For example, the high-level constructs could be connected by an edge making them sequentially dependent; or the high-level constructs could be in two independent/parallel paths in the graph that merges to a common node. They could be in a CFG in locations such that parallel-merging does not change the basic behavior of the CFG. In certain cases, parallel-merging can be associated with some additional condition checks. Parallel-merging can also happen iteratively, where the final merged node in HLIR is obtained by parallel-merging different combinations of previously parallel-merged nodes or original nodes in the HLIR.

Figure 7:
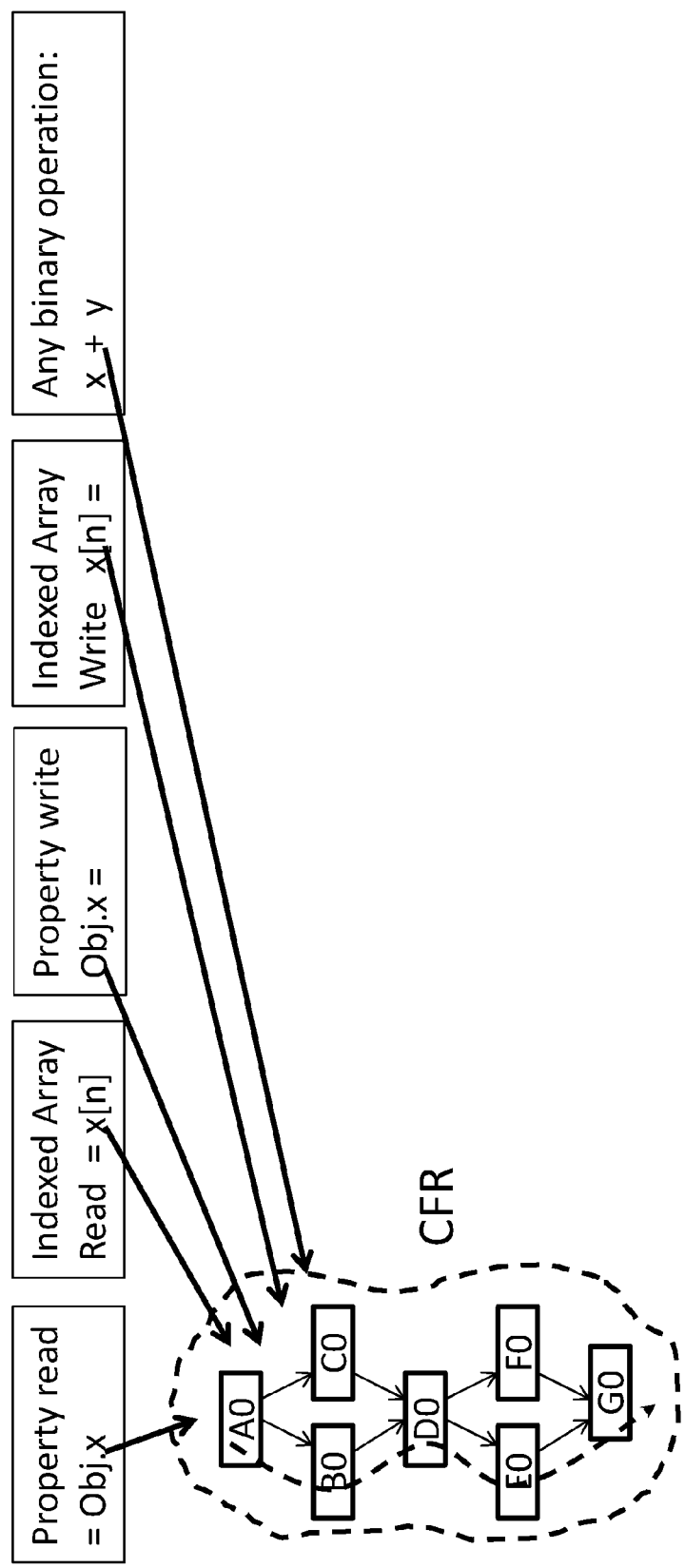
FIG. 7 depicts known basic context types that become SESE CFRs and may be parallel-merged together.

Referring to FIG. 6 for example, shown is a list of useful contexts that are in the library of contexts and for each contexts the information about their structure, function, and the lowering rules with the needed fail safety checks and support needed for a functionally correct parallel-merging. And as shown in FIG. 7, many basic constructs (which may be in the library of known context types 111) when lowered generate complex SESE CFRs, which may be merged together as discussed further herein.

In addition, the detection component 110 optionally receives run time profile information, which as discussed further herein, that is generated by the recording (e.g., during interpretation or non-optimized compiling) of control the flow paths taken by the different HLL constructs that are candidates of parallel-merging. This optional profile information may then be used, as discussed further herein, to determine the profitability of performing the parallel-merging by an optimizing compiler.

Once constructs are detected that may be viably merged together, the parallel merging component 112 then modifies the first intermediate representation 118 of the source code by parallel-merging the detected constructs to generate a modified intermediate representation 120 of the source code 106 (Block 308). The modified intermediate representation 120 of the source code 106 enables equivalent operations of the detected consecutive constructs to execute in parallel during runtime when assembly code is generated from the modified intermediate representation 120, which contains representations of the detected constructs as merged constructs (Block 308).

Figure 8:
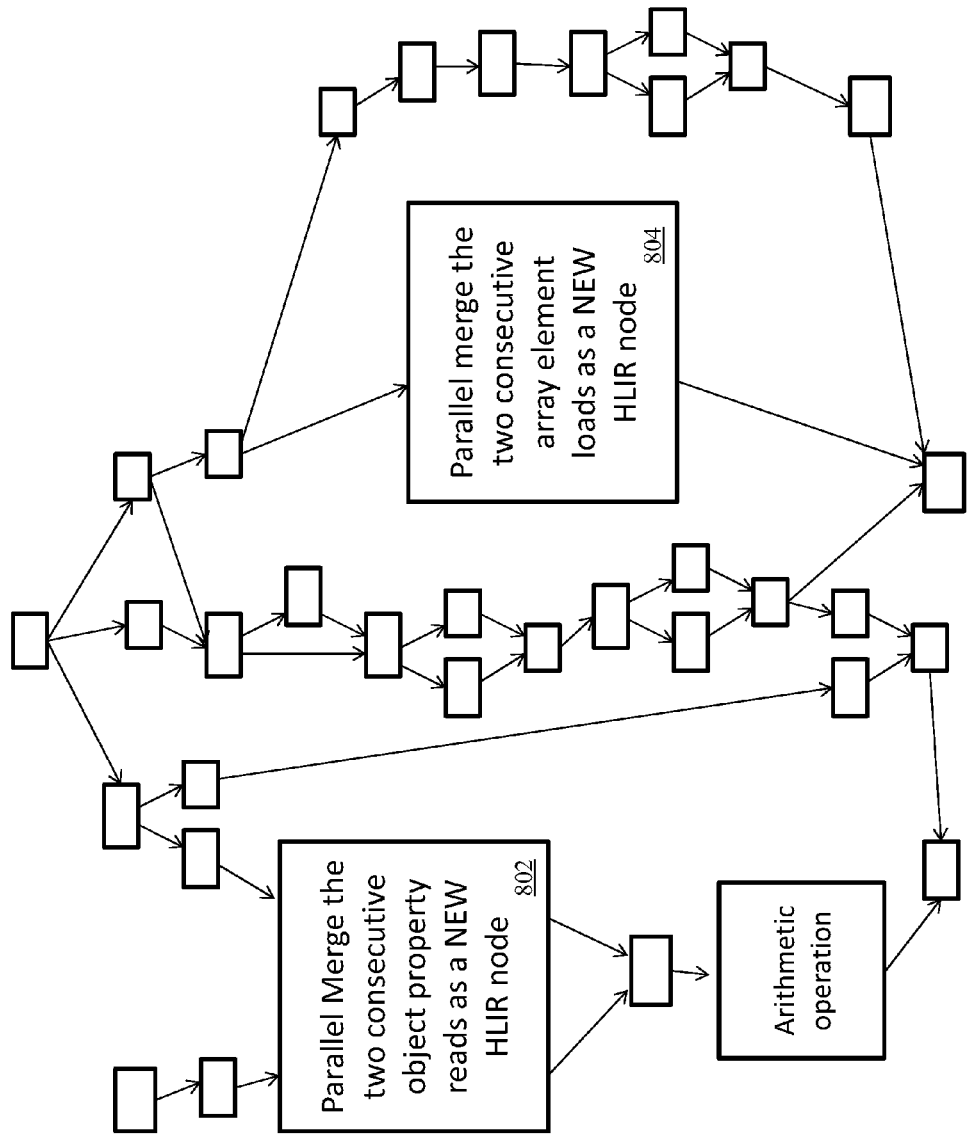
FIG. 8 depicts a modified intermediate representation of the intermediate representations constructs described with reference to FIG. 5.

Referring to FIG. 8 for example, depicted is a modified HL intermediate representation generated from the HL intermediate representation described with reference to FIG. 5. As shown, the four high-level nodes depicted in FIG. 5 have been parallel-merged into two high-level nodes at the HL intermediate representation level (e.g., at an AST or CFG level). More specifically, the first and second object property read constructs 502, 504 depicted in FIG. 5 have been merged into a parallel-merged object property read construct 802, and the first and second array element load constructs 506, 508 have been parallel-merged into a parallel-merged array element load construct 804. Notably, the parallel-merging (described herein in connection with several embodiments) is carried out at the high level intermediate representation (e.g., AST or CGF level) that exists after the source code 106 is parsed but before it is lowered into a low level intermediate representation and subsequently generated to assembly code by the compiler back-end (when a compiler is used) and before interpreter-engine-formatted-code is generated (when an interpreter is used).

Referring next to FIG. 9, shown is a diagram depicting the difference between consecutively executed control flow regions (CFR1 and CFR2), which is the manner the control flow regions (CFR1 and CFR2) would be executed in the prior art, and a parallel-merged construct generated by lowering the constructs from the high level intermediate representation that correspond to the consecutively executed control flow regions (CFR1 and CFR2). As depicted, CFR1 and CFR2 have the same structure and function and are executed consecutively when they are not merged, and as shown, the two control flow regions are parallel-merged to create a parallel-merged construct that has an execution trace that is the same for both constructs. FIG. 9.

It should be recognized that FIG. 9 is not intended to depict parallel-merging at a level that is lower than a higher level AST or CGF. It is instead intended to depict how two consecutive high-level intermediate representation nodes would appear if they are lowered without parallel-merging, and how the same consecutive high-level intermediate representation nodes would appear if they are parallel-merged before being lowered to a lower level representation.

Referring again to FIG. 3, once the modified intermediate representation 120 (including the parallel-merged representation of the constructs) is created, the modified intermediate representation 120 is compiled or interpreted for parallel execution (Block 310). The parallel execution can be various forms: VLIW, multiple-issue/dispatch of a superscalar RISC processor, SIMD and vectorized, or a combination of two or more of any of these.

And if the parallel execution of the runtime operations of the parallel-merged constructs causes an error, execution is carried out using code generated from unmodified representations of the constructs so the operations of the constructs execute sequentially during runtime (Block 310). With respect to the embodiment depicted in FIG. 1, the modified intermediate representation 120 of the source code 106 includes both the parallel-merged representation of the constructs and the unmodified representations of the constructs so that the unmodified representation of the constructs may be lowered to a representation that may be compiled or interpreted.

Figure 10:
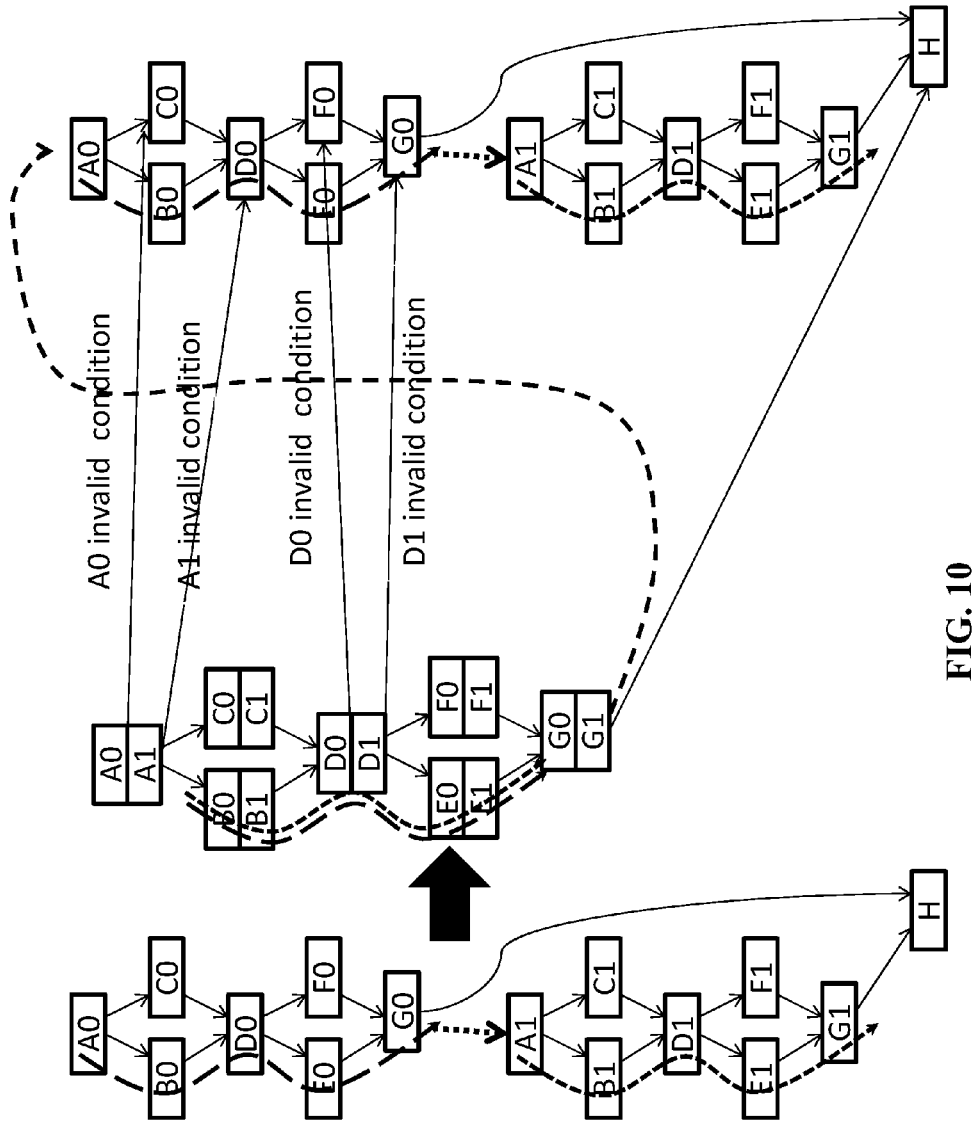
FIG. 10 depicts an instance during which the parallel execution of the runtime operations of two constructs results in invalid conditions.

Referring to FIG. 10, depicted is an instance during which the parallel execution of the runtime operations of two constructs results in invalid conditions, and as a consequence, the execution reverts back to execution of assembly code generated from unmodified representations of the constructs so the operations of the constructs execute sequentially during runtime.

Figure 11:
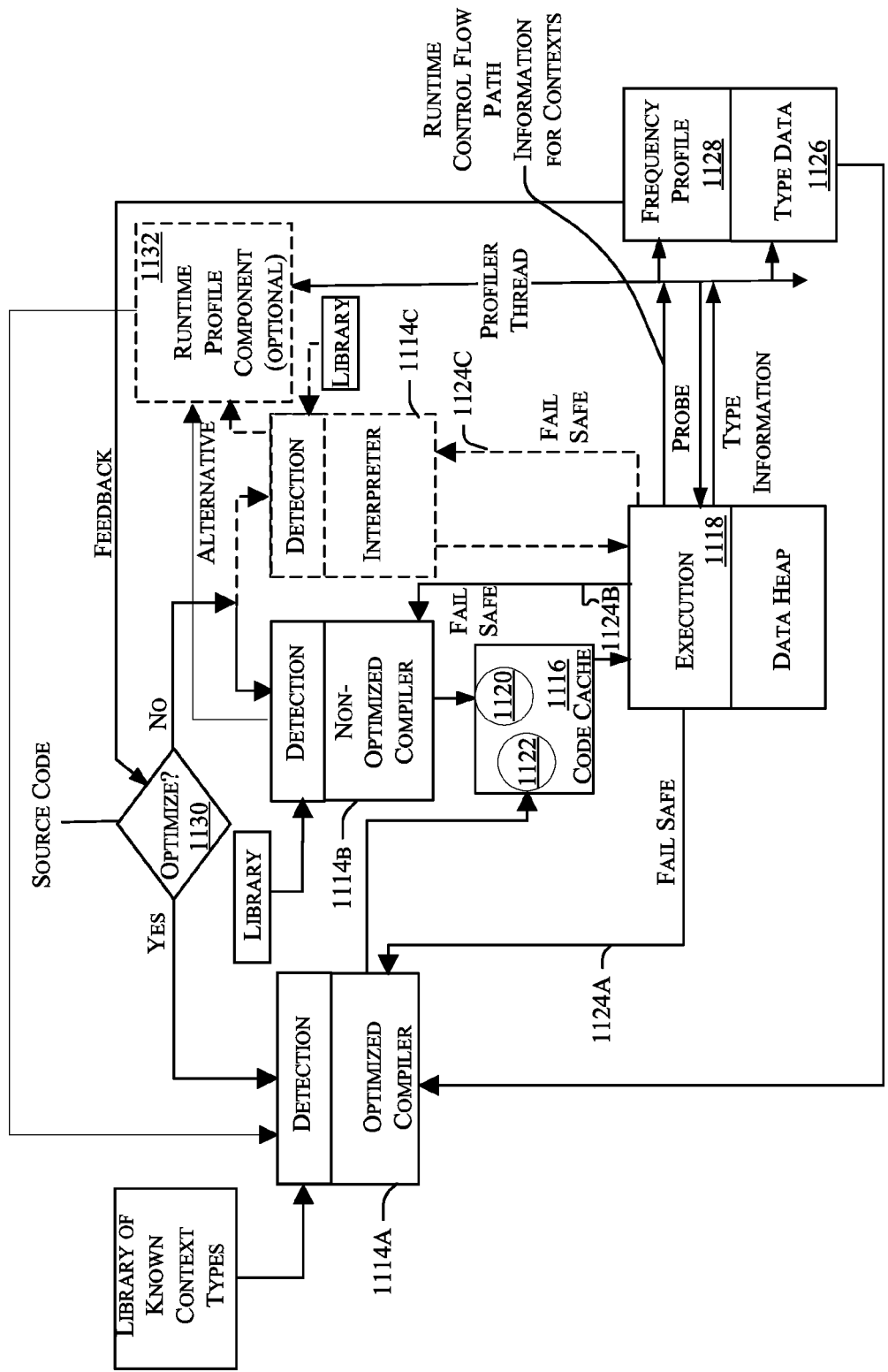
FIG. 11, shown is a block diagram depicting an exemplary virtual machine that incorporates several aspects of the present invention.

Referring next to FIG. 11, shown is a block diagram depicting an exemplary virtual machine that incorporates several aspects of the present invention. As shown, the virtual machine in this embodiment includes an optimized compiler 1114A and either a non-optimized compiler 1114B or an interpreter 1114C. For simplicity, the description of the embodiment depicted in FIG. 11 is described assuming the optimized compiler 1114A works in connection with the non-optimized compiler 1114B, but it is certainly contemplated that the optimized compiler 1114A and the interpreter 1114C may work together. In addition, the intra-operation of each of the optimized compiler 1114A, the non-optimized compiler 1114B, and the interpreter 1114C is described in more detail with reference to FIGS. 12, 13, and 17, respectively; thus those details are not repeated here in connection with the description of FIG. 11. Instead aspects of the inter-operation of the optimized compiler 1114A, the non-optimized compiler 1114B, and the interpreter 1114C are described with reference to FIG. 11.

In this embodiment, the non-optimized complier 1114B performs a first level of compiling to create code (e.g., JIT code) that is stored as non-optimized code 1120 and executed from a code cache 1116 by an execution component 1118. It is noted that if the interpreter 1114C is utilized, the code cache 1116 is not used by the interpreter 1114C.

As shown, a profiler thread probes the execution component 1118 to obtain type information about each variables in the program, and records the type information in a type data component 1126. And in addition, a frequency profile 1128 is captured that indicates how many times each function is executed. For region based JIT compilers the frequency profiler could capture how many times a particular region is executed. And as shown, the frequency information is provided as feedback so a decision 1130 can be made whether to optimize particular functions (or regions, for region based JIT compilers) with the optimized compiler 1114A (e.g., the more frequently executed functions or regions) or to utilize the non-optimized compiler 1114B (or the interpreter 1114C) (e.g., for the less-frequently executed functions or regions). Although the time it takes the optimized compiler 1114A to compile code is longer than the time it takes the non-optimized compiler 1114B to compile the code, the executable code that is produced by the optimized compiler 1114A executes much faster than the executable code produced by the non-optimized compiler 1114B. As a consequence, for functions or regions that are executed relatively frequently, it makes sense to use the optimized compiler 1114A to create optimized executable code that is cached in the code cache 1116. In addition, the type data component 1126 is coupled to the optimized compiler 1114A to provide the information about the runtime data types seen for the program variables and that helps to generate efficient assembly code by the compiler through type-specialization.

If source code is to be optimized, the optimized complier 1114A, performs a second level of compiling to create code (e.g., JIT code) that is stored as optimized code 1122 in the code cache 1116.

As shown, and as discussed further herein, there are fail-safe paths 1124A, 1124B, 1124C that couple the execution component 1118 to each of the optimized compiler 1114A, the non-optimized compiler 1114B, and the interpreter 1114C, respectively. These fail safe paths transfer control from the optimized JIT code execution to the non-optimized version when certain assumptions in the optimized code (e.g., optimized JIT code) becomes invalid during runtime and execution needs to fall into the non-optimized version of the JITed code or the interpreter that does not make such assumptions.

Also shown are an optional runtime profile component 1132, which may used, as discussed in connection with FIG. 1, and as discussed further herein with reference to FIGS. 12, 13, and 17, to improve the detection of constructs that may be viably parallel-merged.

Figure 12:
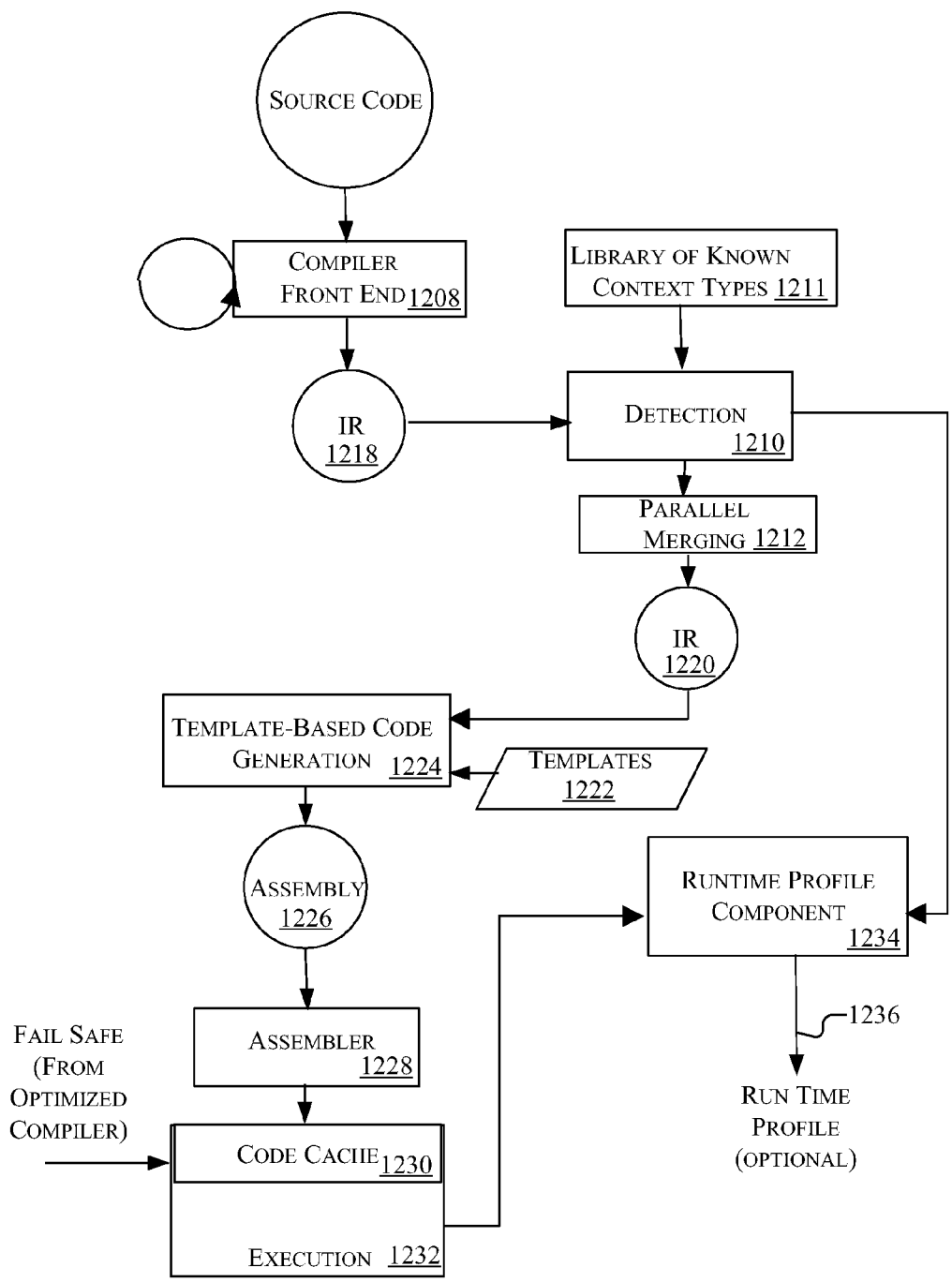
FIG. 12, it is a block diagram depicting an exemplary embodiment of a non-optimized compiler.

Referring next to FIG. 12, it is a block diagram depicting an exemplary embodiment of the non-optimized compiler 1114B of FIG. 11. As shown, a compiler front end 1208 receives source code and generates a first high level intermediate representation 1218 (e.g., and AST or CFG) which a detection component 1210 accesses to detect (using a library of known context types 1211) a set of constructs in the first high level intermediate representation 1218 that would otherwise without embodiments of this invention be executed consecutively during runtime and that are equivalent in structure and function. The compiler front end 1208 in this embodiment is adapted so that (unlike a typical compiler front end in a non-optimized compiler) the source code is iteratively analyzed so that consecutive constructs are available in the first intermediate representation 1218 for the detection component 1210 to analyze. As shown, if constructs that may be viably merged are detected, a parallel merging component 1212 modifies the first high level intermediate representation 1218 to generate a modified high level intermediate representation 1220 that includes a parallel-merged representation of the detected constructs.

In this embodiment, additional templates 1222 are added to a template-based code generation component 1224, which generates assembly code 1226 that is assembled into executable code by an assembler 1228. And the executable code is cached in a code cache 1230 of an execution component 1232, which is configured to execute the executable code. Although template-based assembly code generation is utilized in prior implementations, in the present embodiment the templates 1222 include new templates that are added to accommodate the parallel-merged representation of two or more constructs in the modified high level intermediate representation 1220.

As depicted, the code cache 1230 in this embodiment is also accessed by a failsafe input to initiate the execution of cached (non-optimized) executable code in the event the optimized executable code generated by the optimized compiler 1114A depicted in FIG. 11 runs into certain situations where any assumption used for its optimizations becomes invalid at runtime.

Also shown is a runtime profile component 1234, which is disposed to receive execution information from the execution component 1232 and detection information from the detection component 1210. The runtime profile component 1234 operates to keep track of the control path executed by a SESE CFR corresponding to a high level construct that is present in the library of known context types and have been detected in the CFG of an application program. A context type identifies a set of specific HL constructs with their connectivity pattern and constraints and defines the signature of a parallel-merge candidate.

The detection component 1210 in several embodiments detects certain groups of high level constructs, which when lowered into SESE CFRs, would have the same structure and function and at runtime would take the control flow path. And as previously discussed herein, other types of detection may also be performed. The runtime profile component 1234 records the control flow path actually taken and also records the frequency of hitting the error condition. This information is used for further filtering the decisions of the detection component 1210. For example, if it is found that the error conditions are hit frequently (e.g., greater than 50% of the time, but it should be noted that 50% is just an example and not a predetermined fixed value. Each implementation can tune and set up a particular value) the parallel merging (by the parallel merging component 1212 (or parallel merging component 1312 in FIG. 13) may not be applied even if the detection component 1210 (or detection component 1310 in FIG. 13) detected certain group of HLIR operations for parallel merging. But it should be recognized that the runtime profile component 1234 is not a mandatory module and can be implemented as an optional component.

The profile information 1236 can appear as: (i) a percent of time the error condition happened, and this would be sufficient if, for a particular HLIR node's SESE CFR, there is a well-known specific control flow path that is always taken if the error condition does not occur; and (ii) the actual control flow path recorded a sequence of nodes in the SESE CFR for the HLIR construct.

Figure 13:
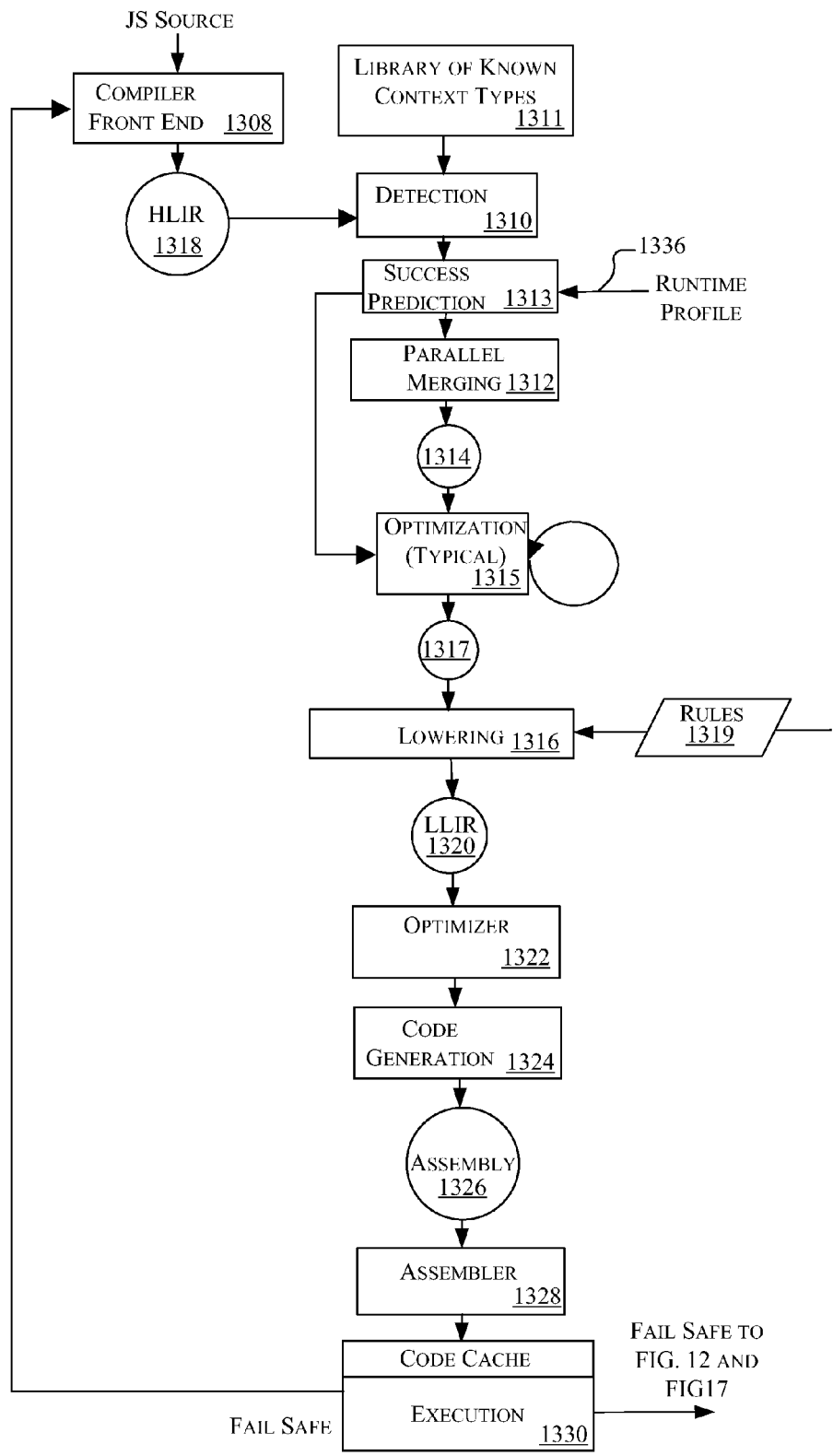
FIG. 13 is a block diagram depicting an exemplary optimized compiler.

Referring next to FIG. 13, shown is an exemplary optimized compiler that may be used to realize the optimized compiler 1114A depicted in FIG. 11. As shown, source code is received by a compiler front end 1308, which generates a high-level intermediate representation 1318 of the source code. For example, the high-level intermediate representation 1318 of the source code may be an abstract syntax tree (AST) or a control flow graph (CFG). As shown, the detection component 1310 in this embodiment utilizes a library of known context types 1311 to detect constructs in the high-level intermediate representation (HLIR) 1318 that otherwise without utilizing disclosed embodiments of the present invention would be executed consecutively during runtime and that are equivalent in structure and function. A context type identifies a set of specific HL constructs with their connectivity pattern and constraints and defines the signature of a parallel-merge candidate.

In this embodiment, a success prediction component 1313 is disposed to receive optional runtime profile information 1336 (e.g., from the runtime profile component 1132) to assess whether the consecutive constructs that were detected by the detection component 1310 are likely to be successfully executed after being parallel-merged. As shown, if the likelihood of success is not high enough, the high-level intermediate representation 1318 of the source code bypasses the parallel merging and moves ahead to undergo optimizations of the current art in the component 1315 without the detected constructs being parallel-merged. The current art optimizations that occur in the component 1315 are common subexpression elimination, value numbering based redundancy elimination, constant propagation, constant folding, dead-code elimination, loop invariant code motion, etc. that are classified as machine independent middle end compiler optimizations in the current art. But if the likelihood of the parallel-merged constructs executing without errors is high enough, the parallel merging component 1312 parallel-merges the detected constructs into a high level intermediate representation with parallel merged nodes 1314, which are then optimized by the component 1315 into an optimized high level intermediate representation 1317, and then lowered by a lowering component 1316 using lowering rules 1319 that are specifically designed to lower the parallel-merged constructs to a low-level intermediate representation (LLIR) 1320.

In general, lowering rules are used to create an SESE CFR from a particular HLIR node in the high-level intermediate representation 1318. The operations in the generated SESE CFR from a HLIR node using the rules 1319 are very similar to machine operations; however, the operands are not register or memory allocated yet. Also the operations are not mapped to any particular processor instruction and not yet scheduled. Subsequent optimization phases on the LLIR 1320 later results in instruction selection, scheduling, register allocation, and stack allocation leading to the generation of the final assembly code. For processors containing SIMD and vector instructions the lowering rules can attach vector types to the operands if the lowering results in SIMD operations. The vector-types can be used in the subsequent optimization and instruction selection phase to generate a SIMD/Vector instruction of the particular processor.

The new rules 1319 for lowering the parallel-merged high level constructs from the high level intermediate representation to low level intermediate representation leads to the final efficiency and the correctness of the improved execution. The new rules for a particular parallel-merged high level construct generates the parallel merged CFR by doing one-by-one aggregation of the low level operations leading to the presence of multiple same low level operations in the low level intermediate representation side by side as equal to the number of similar high level constructs parallel-merged. After the lowering of the parallel merged high level constructs the merged CFR in the low level intermediate representation go through the same optimization steps as mentioned earlier in this paragraph and finally emitted as assembly that can have VLIW and SIMD/Vector instructions and can be in a structure very favorable for wide-issue superscalar processors.

Figure 14A:
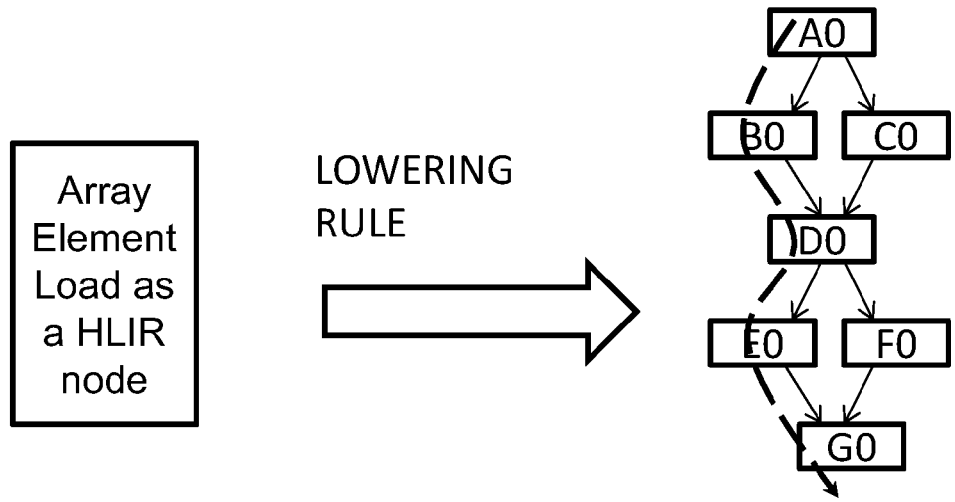
FIGS. 14A and 14B are diagrams depicting typical prior approaches to lowering an array element load construct and a property read construct, respectively.
Figure 14B:
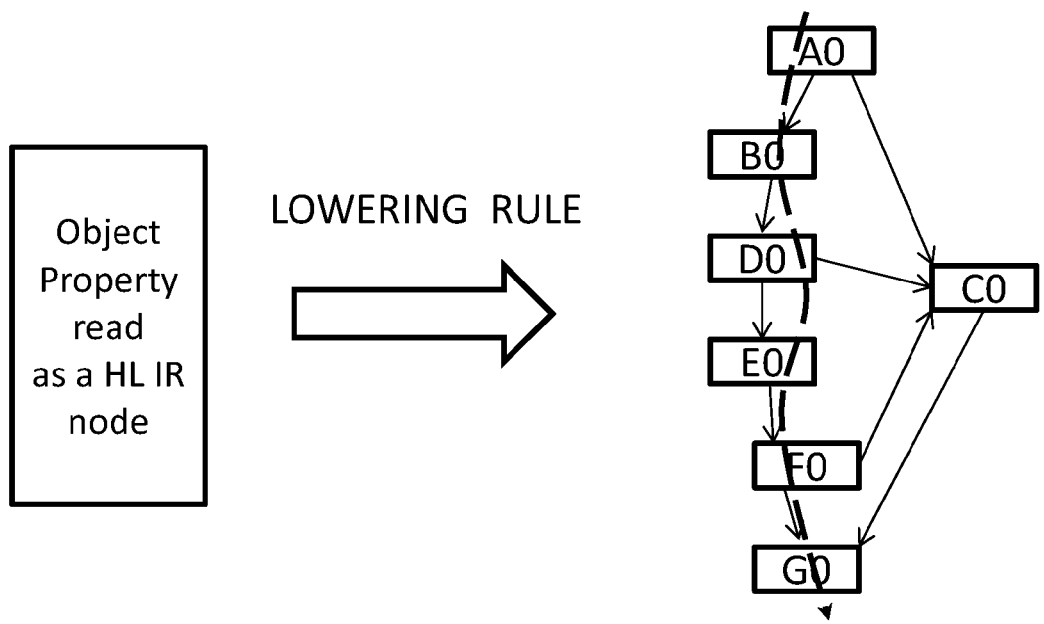
Figure 15A:
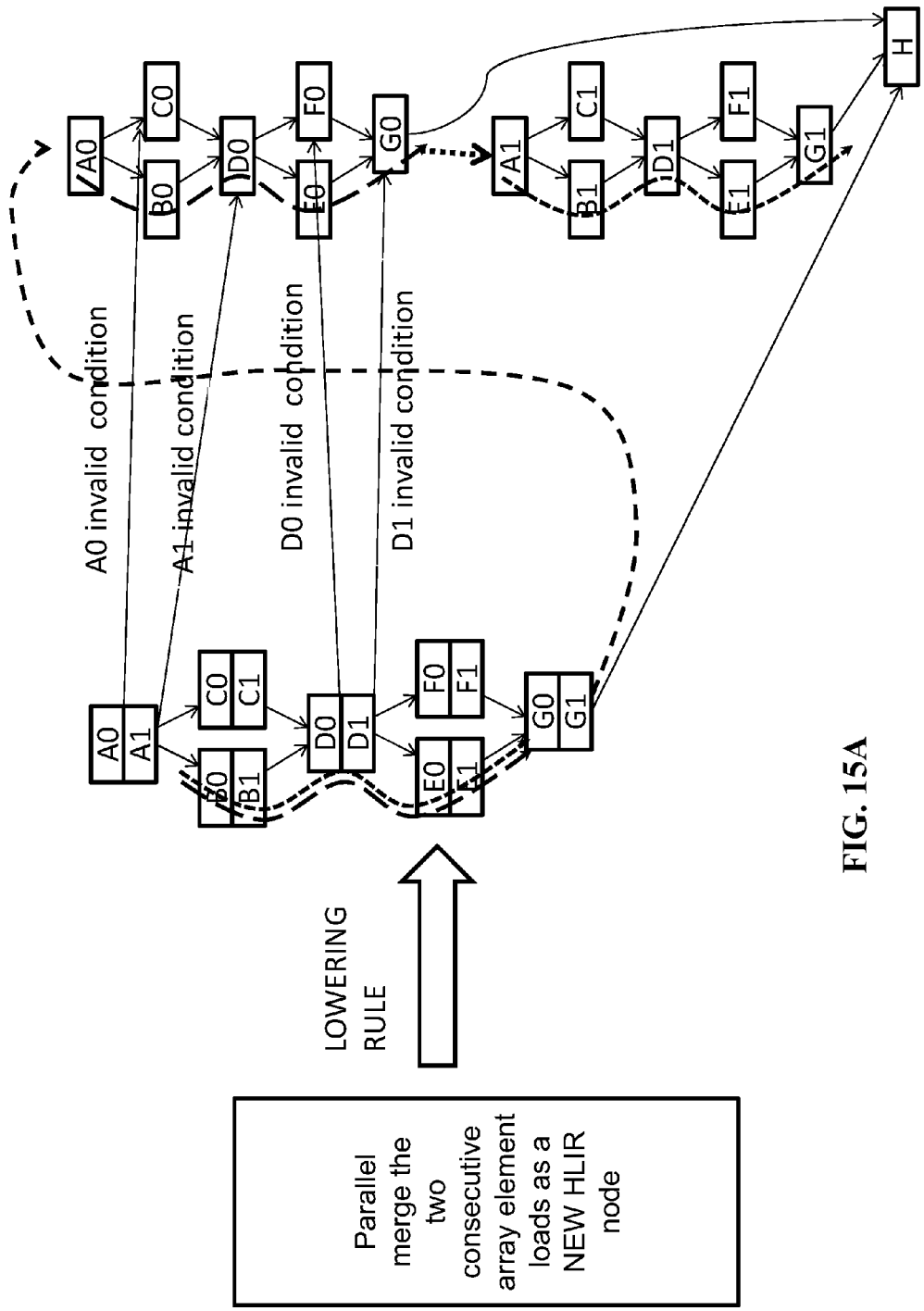
FIGS. 15A and 15B are diagrams depicting lowering parallel-merged array element load construct and a parallel-merged property read construct, respectively.
Figure 15B:
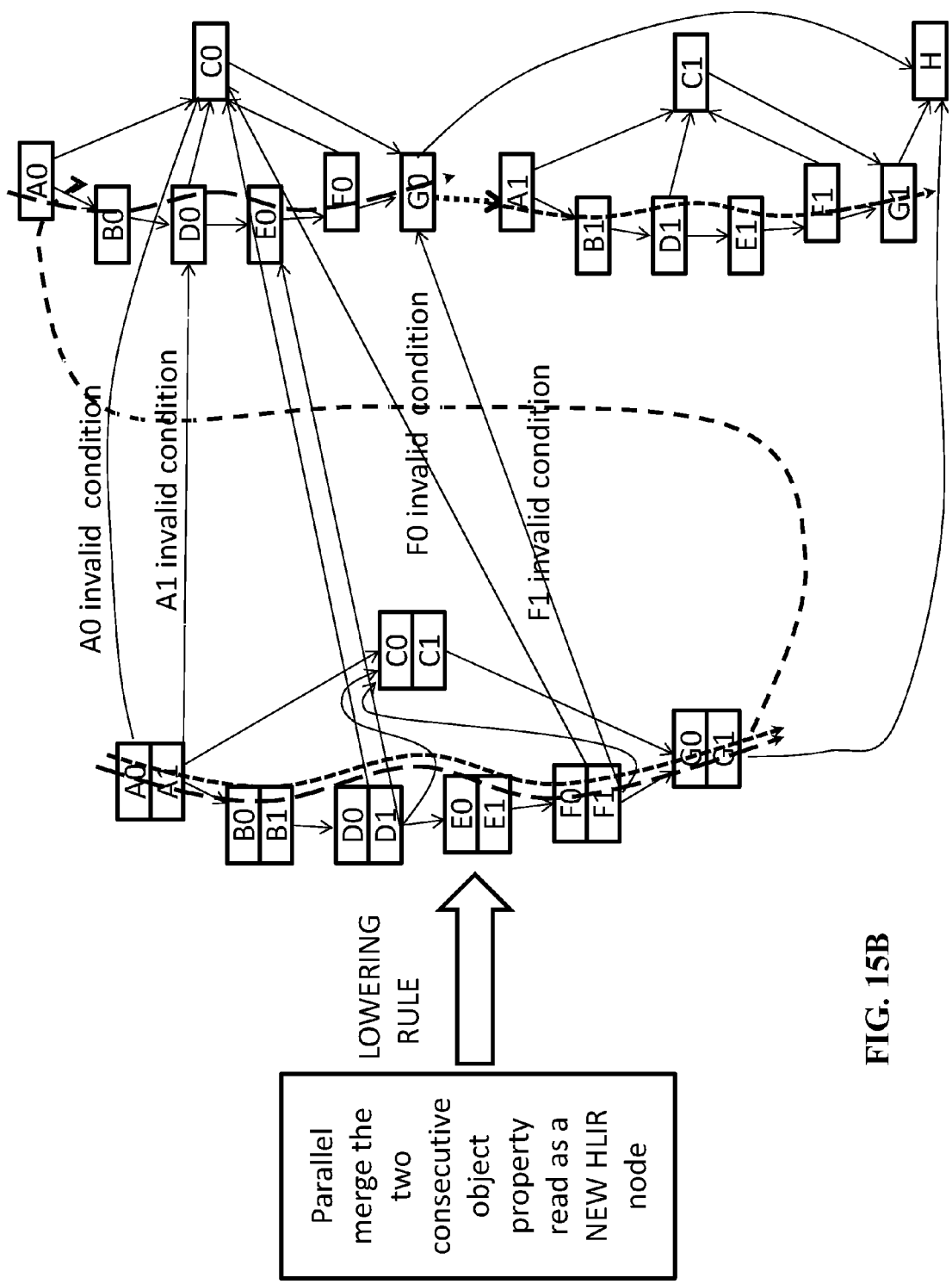

Referring briefly to FIGS. 14A and 14B, shown are typical prior approaches to lowering an array element load construct and an object property read construct according to typical prior lowering rules, respectively. And in contrast, shown in FIGS. 15A and 15B are lowering of a parallel-merged array element load construct (e.g., parallel-merged array element load construct 804) and lowering of a parallel-merged object property read construct (e.g., parallel-merged object property read construct 802), respectively, consistent with several embodiments. Also shown are error detection checks that are generated during the lowering according to the rules 1319. It is to be noted that the exact CFR structure for any of the object property read or array load may be a bit different from one JIT compiler/VirtualMachine to another based on the differences in their design, and also different from the structures shown in in this invention. The CFR structures shown in this invention can be considered as examples for the purpose of explaining the basic steps of this invention.

Figure 16:
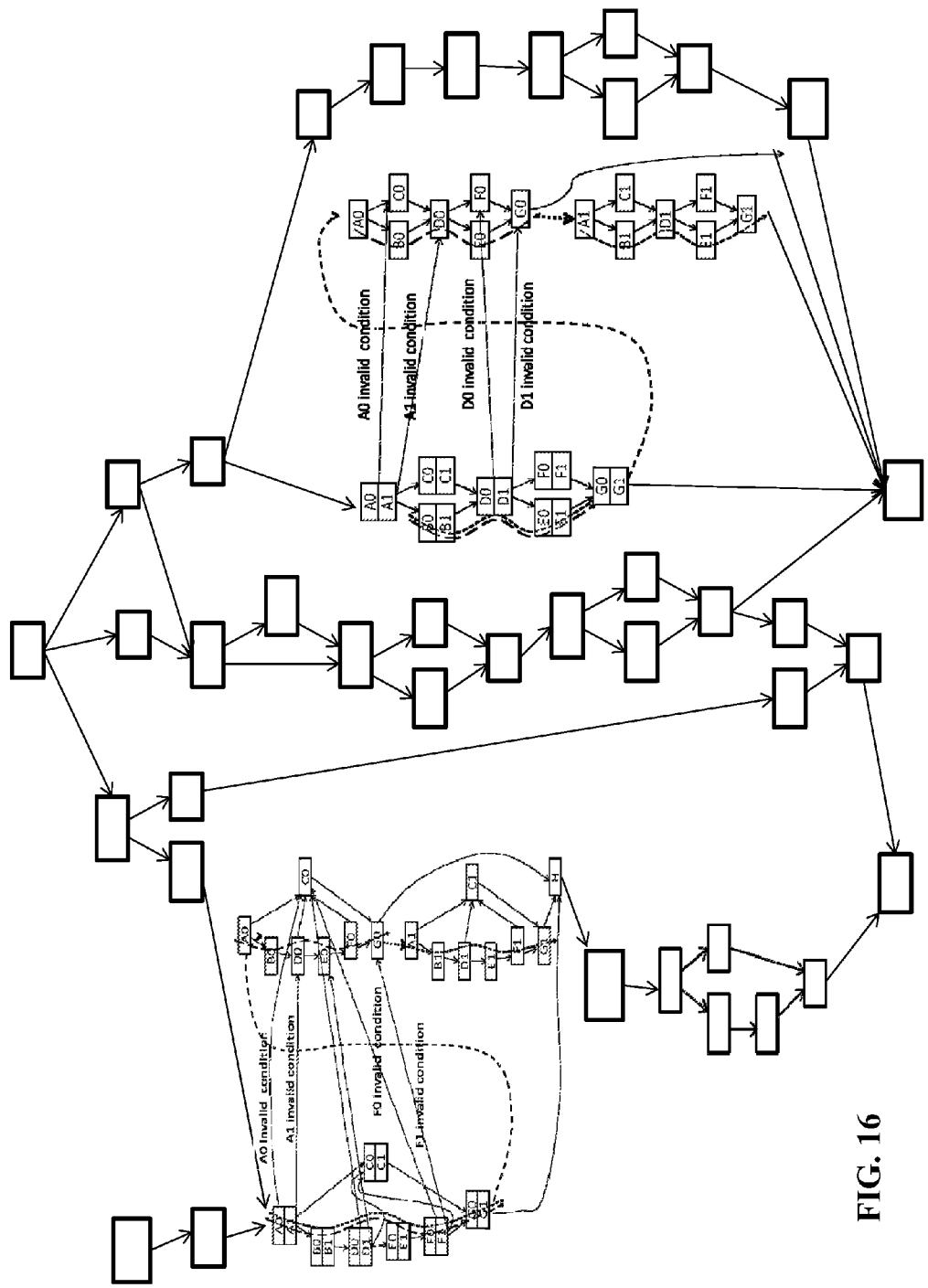
FIG. 16 is a low-level intermediate representation of the modified intermediate representation depicted in FIG. 8.

And shown in FIG. 16 are the LLIR representation of the parallel-merged array element load construct and the parallel-merged object property read construct of FIGS. 15A and 15B, respectively, in the context of other LLIR constructs in the LLIR 1320 that are generated by the lowering component 1316.

Referring again to FIG. 13, the LLIR 1320 is then optimized by an optimizer 1322 before a code generation component 1324 generates assembly code 1326 that is assembled by an assembler 1328 to generate machine code that is executed by an execution component 1330. As shown, there are fail safe paths that transfer control from the optimized code execution (e.g., optimized JIT code execution) to the non-optimized version (or the interpreter) when certain assumptions in the optimized code becomes invalid during runtime and execution needs to fall into the non-optimized version of the code or the interpreter that does not make such assumptions. The error condition support in parallel-merging and their lowering rules ensures that there is no invalid assumptions and prevents the triggering of the fail safe paths. However, if error condition support codes are not generated during the lowering of the high level parallel-merge constructs, then the fail safe bailouts from optimized execution can be triggered. The fail safe paths can also get triggered when assumptions become invalid during runtime for any other optimizations done on the code that are already in the current art. As shown, if fail safe condition is triggered during execution, the execution of the optimized JIT code will cease and execution will revert to the non-optimized code 1120 that is cached in the code cache 1116 in FIG. 11.

Figure 17:
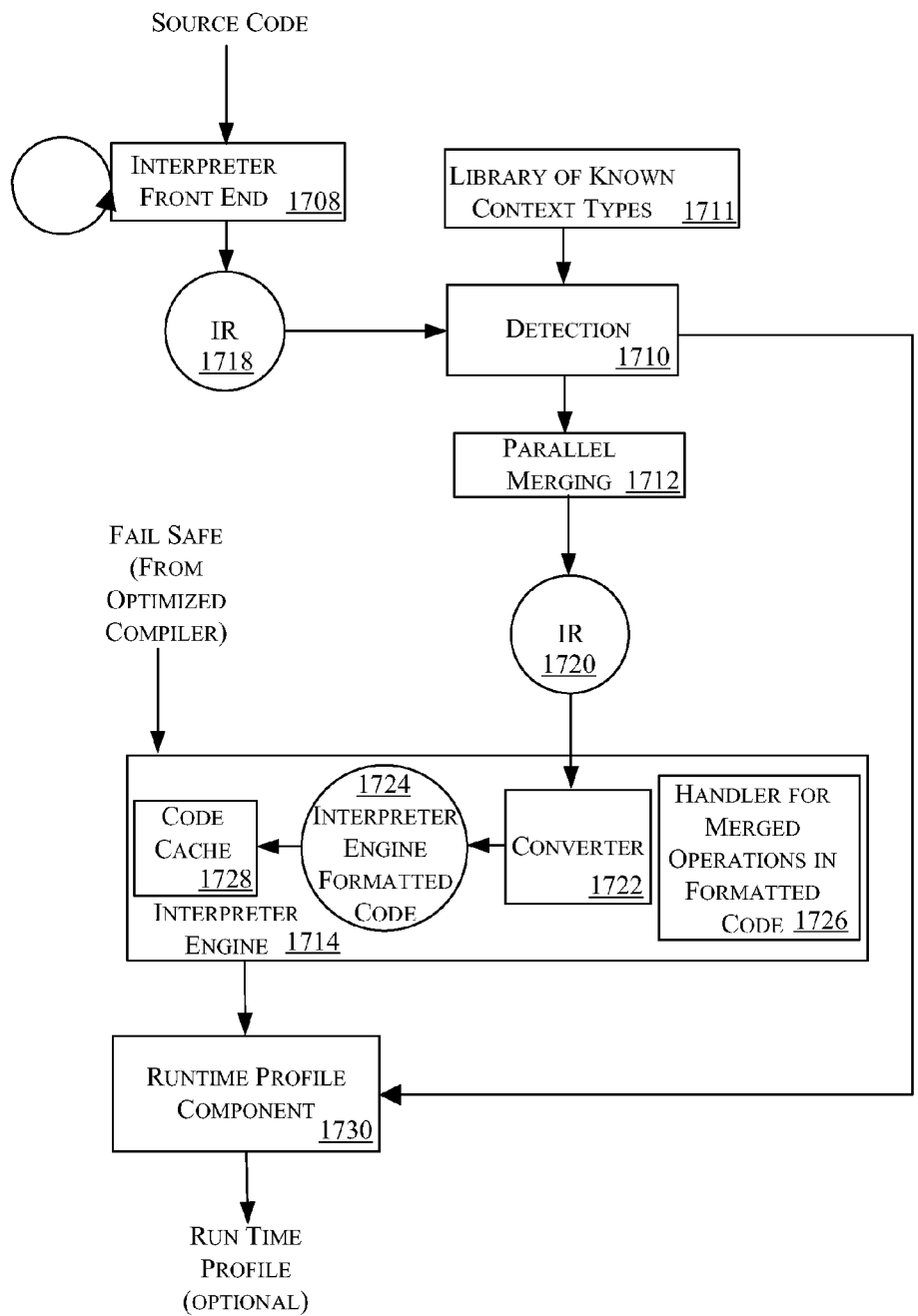
FIG. 17 is a block diagram of an interpreter that includes several inventive aspects.

Referring next to FIG. 17, shown is a block diagram of an interpreter that has been modified to include several inventive aspects. As shown, an interpreter front end 1708 receives source code and parses the source code to generate a first higher level intermediate representation 1718 of the source code, which may be an AST or CFG. And the detection component 1710 in connection with the library of known context types 1711 detects a group of high level constructs that satisfy constraints for parallel merging. For example, the detection component 1710 in many embodiments detects a group of high level constructs that would be executed consecutively during runtime and are equivalent in structure and function. In addition, several embodiments of the detection component 1710 also utilize other types of detection as discussed previously herein. And if there are constructs that are detected may be parallel-merged, the parallel-merging component 1712 modifies the first intermediate representation 1718 of the constructs by parallel-merging the detected constructs to generate a modified intermediate representation 1720 that enables equivalent operations of the detected constructs to execute in parallel during runtime after a converter 1722 converts the modified intermediate representation 1720 to interpreter-engine-formatted code 1724, and a handler 1726 for the new merged operations executes the interpreter-engine-formatted code 1724 from a code cache 1728.

Also shown is an optional runtime profile component 1730, which is disposed to receive execution information from the interpreter engine 1714, and detection information from the detection component 1710. The runtime profile component 1730 operates to keep track of the control paths executed by an SESE CFRs corresponding to a high level constructs that are present in the library of known context types 1711 and have been detected in the CFG of the application program. The detection component 1710 detects certain groups of high level constructs that when lowered into SESE CFR would have the same structure and function and at runtime would take the control flow path. And other modes of detection and parallel merging, for high level constructs that are different and have a predominant BB in their CFR through which the control flow path must flow, have been listed herein. The runtime profile component 1730 records the control flow path actually taken and also records the frequency of hitting the error condition. It uses this information for further filtering the decisions of the detection component 1710. For example, if it is found that the error conditions are hit frequently (e.g., greater than 50% of the time. Note that 50% is just an example and not a predetermined fixed value. Each implemented can tune and set up a particular value), the parallel merging (by the parallel merging component 1712, or 1312 in FIG. 13) may not be applied even if the detection component 1710 (or 1310 in FIG. 13) detected certain groups of HLIR operations for parallel merging. But it should be recognized that the runtime profile component 1730 is not a mandatory module and can be implemented as an optional component.

The profile information can appear as: (i) a percent of time the error condition happened, and this would be sufficient if for a particular HLIR node's SESE CFR there is a well-known specific control flow path that is always taken if the error condition does not occur; and (ii) the actual control flow path recorded a sequence of nodes in the SESE CFR for the HLIR construct.

Figure 20A:
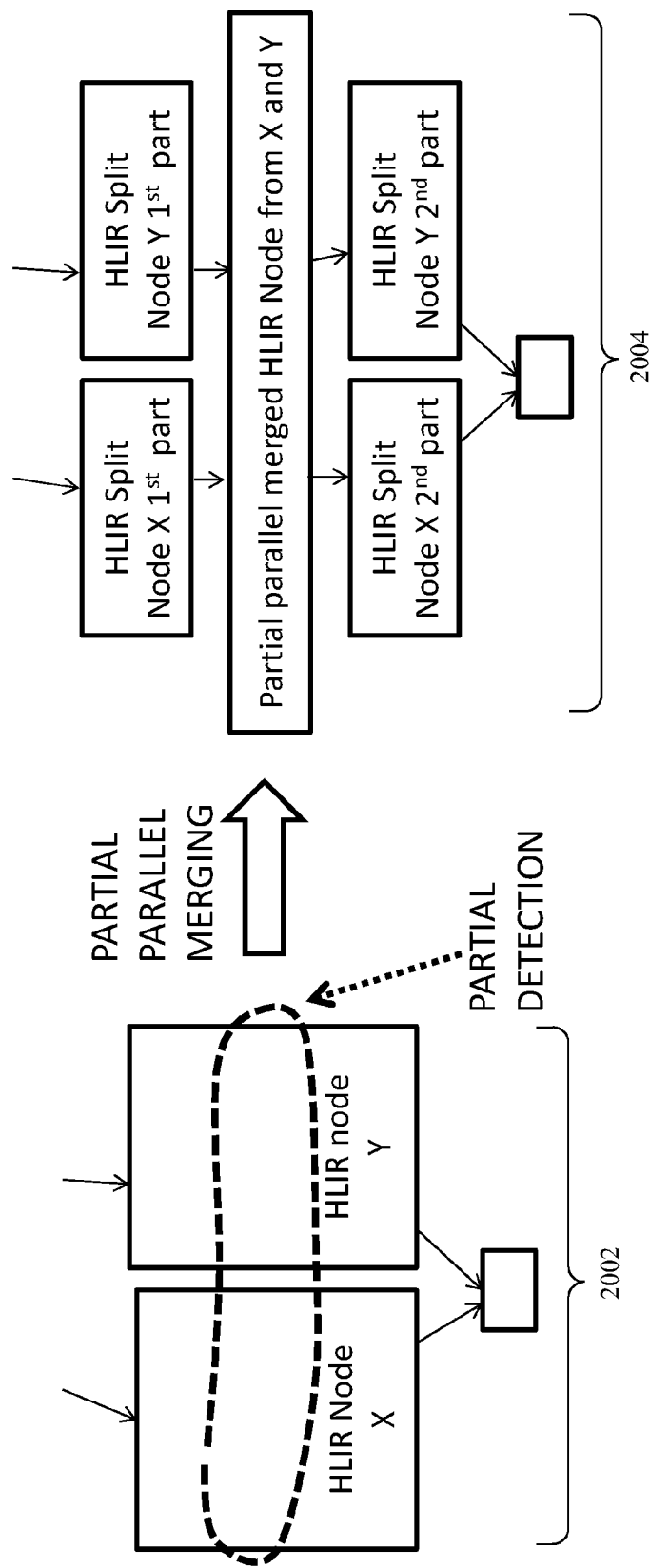
FIG. 20A is diagram depicting an example of detection of partial constructs in the high level intermediate representation and partial parallel merging of the high level constructs.
Figure 20B:
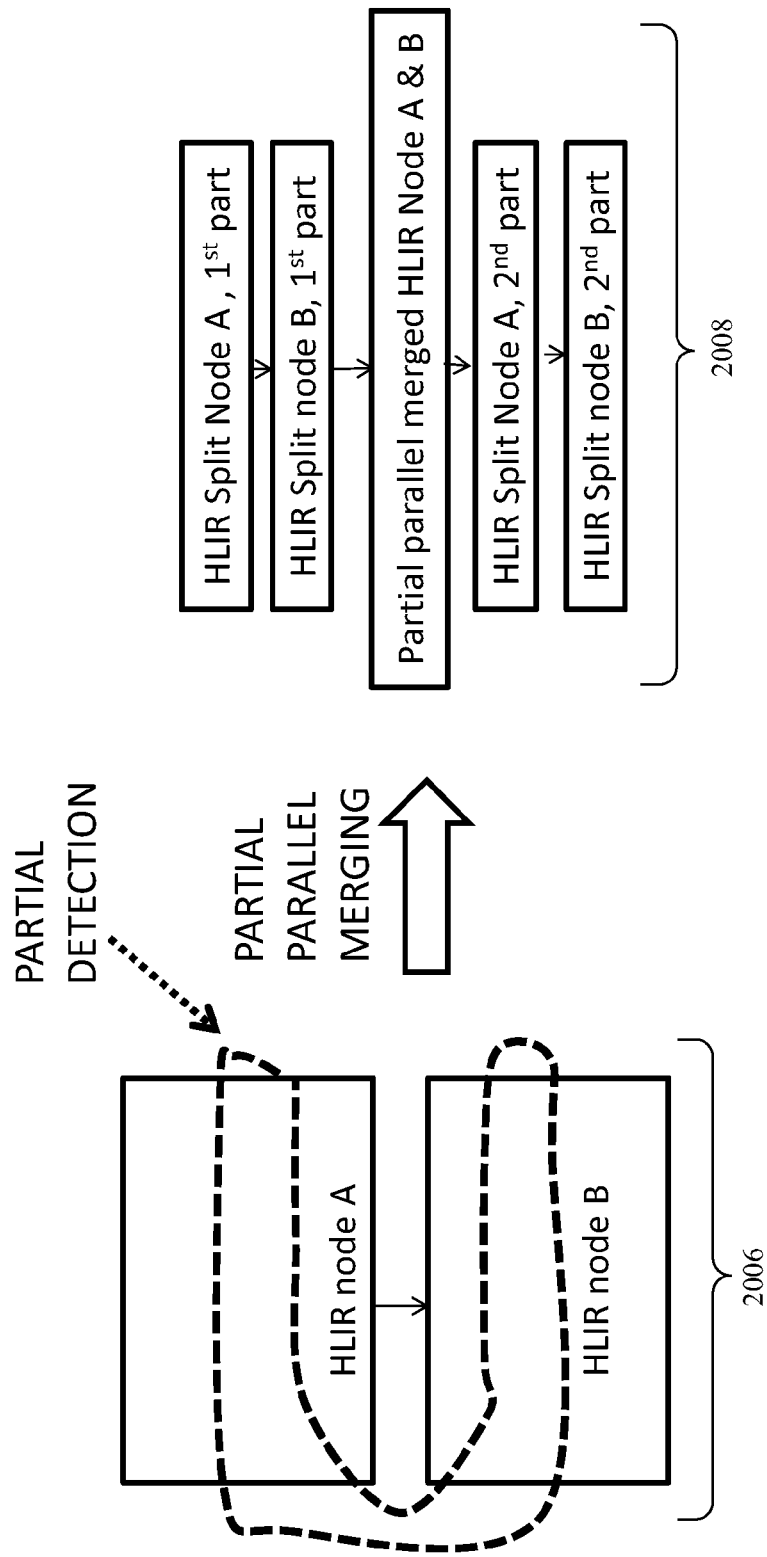
FIG. 20B is a diagram depicting another example of detection of partial constructs in the high level intermediate representation and partial parallel merging of the high level constructs.

Referring next to FIGS. 20A and 20B shown are two instances of partial detection of high level constructs in the high level intermediate language and their partial parallel merging. Shown in FIG. 20A is an instance of partial detection 2002 and the corresponding parallel-merged constructs 2004 after partial parallel merging. Similarly, FIG. 20B is an instance of partial detection 2006 and the corresponding parallel merged constructs 2008 after partial parallel merging. Parallel merging is the process of combining the detected multiple high level constructs represented as nodes in the high-level intermediate representation into one or more new high level constructs that are represented as new nodes in the high-level intermediate representation of the source program and replaces the older nodes that are combined, leading to a modified high level intermediate representation. If more than one new high-level constructs are created as new nodes it is called partial parallel merging. In partial parallel merging, the new nodes created are either portions of older nodes split up, or a combination of multiple portions of the split older nodes, as shown in the partial parallel merged constructs 2004, 2008. The benefit comes from the high performance execution of the partial parallel-merged high level construct when lowered, compiled and assembled into the executable for a JIT compiler, or converted into the interpreter engine formatted code.

Referring to FIG. 19A, it shows detection and parallel merging of two or more different HL constructs, which when lowered, individually expands to pure linear code e.g., a basic block (BB). More specifically, detected HL constructs 1902 (Node N and Node M) are shown that are parallel-merged to give the parallel merged HL construct 1904 (Node NM). Also shown are the individual lowered CFRs 1906 (which are each a single basic block) for the high level constructs 1902. And FIG. 19A shows the lowered CFR 1908 for the parallel merged high level construct 1904.

FIG. 19B shows detection and parallel merging of two or more different high level (HL) constructs 1920, where a first 1922 of the high level constructs 1920 when lowered individually generates a first CFR 1924 and the others (e.g., a second 1926) of the high level constructs when lowered individually generate pure linear code 1928, e.g., a BB, where the BB for each of them gets merged to the most frequently taken control flow path in the CFR, and needs the fail-safe error correction support for cases the most frequently taken control flow path is not taken. The detected HL constructs 1920 (Array Element Load Node, and Node N that lowers to a BB) that are parallel-merged to give the parallel-merged HL construct 1930 (Parallel merged Array element node with Node N). As shown, the individual lowered CFRs (the first CFR 1924, which has control flow, and the other is a single basic block of linear code 1928) for the high level constructs 1920. As shown, the parallel-merged HL construct 1930 may be lowered in at least two different ways to generate a first lowered construct 1932 or a second lowered construct 1934. This example also shows multiple lowering rules for lowering the same parallel-merged high level construct.

FIG. 19C shows detection of partial constructs and partial parallel merging of two or more different high level (HL) constructs 1940, that when lowered include a distinct straight line sequential code (a distinct BB) through which control flow path must pass in their CFRs, where the distinct straight line code sequence (BB) form the regions that are parallel-merged, leading to partial parallel-merging of the high-level constructs. As shown, the detected HL constructs 1940 (Node N and Node M) that are parallel-merged to give the partial parallel merged HL construct 1942 (Partial parallel merged Node NM). Also shown are the individual lowered CFRs 1944 (each of which has a predominant basic block region through which a control path must flow). For example, the regions X,Y,Z and R,S,T,U for the high level constructs 1940. In addition FIG. 19C depicts the lowered CFR 1946 for the partial parallel merged high level construct 1942.

Figure 18:
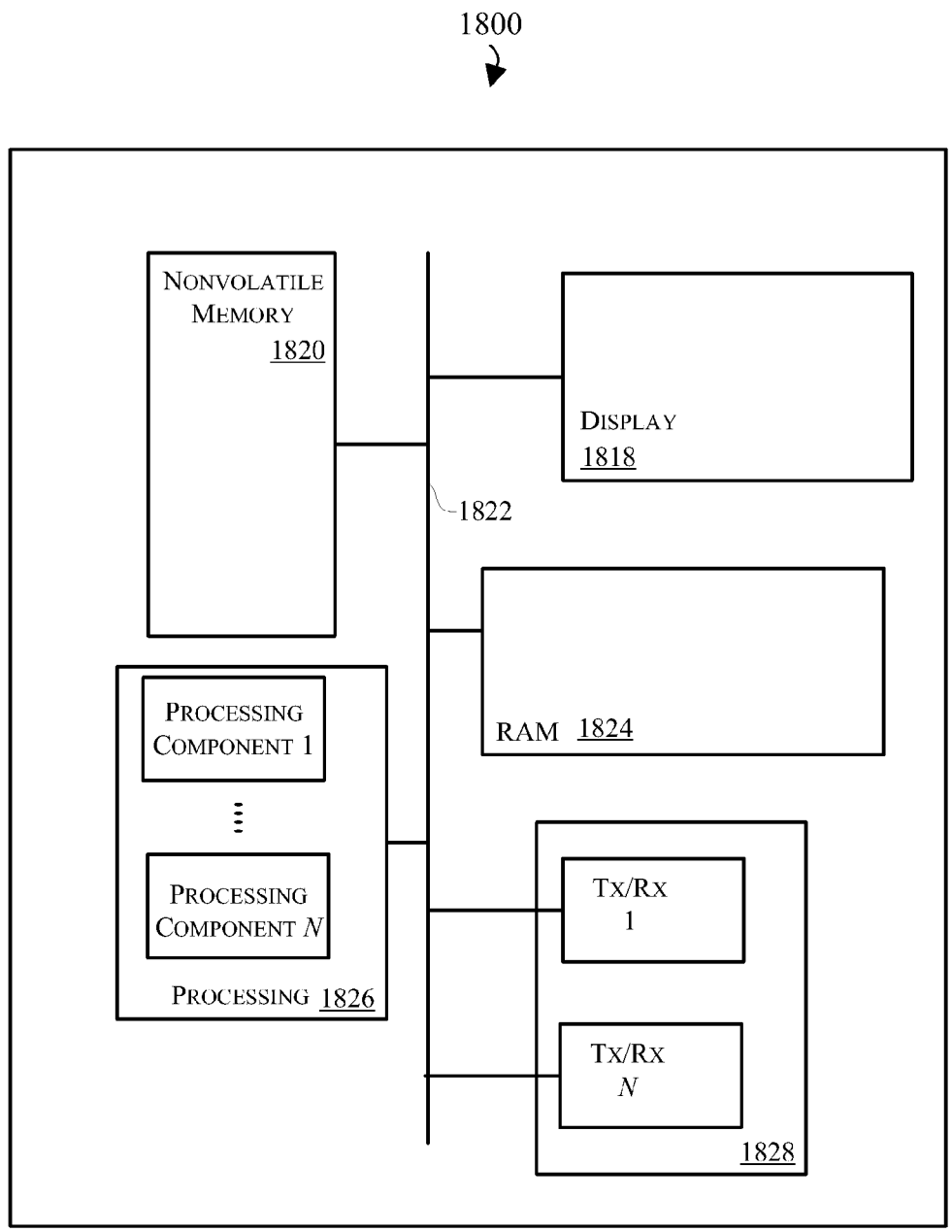
FIG. 18 is a block diagram depicting physical components of an exemplary communication device that may be utilized to realize the communication device described with reference to FIG. 1.

Referring next to FIG. 18, shown is a block diagram depicting physical components of an exemplary communication device 1800 that may be utilized to realize the communication device 100 described with reference to FIG. 1. As shown, the communication device 1800 in this embodiment includes a display 1818, and nonvolatile memory 1820 that are coupled to a bus 1822 that is also coupled to random access memory ("RAM") 1824, N processing components 1826, and a transceiver component 1828 that includes N transceivers. Although the components depicted in FIG. 18 represent physical components, FIG. 18 is not intended to be a hardware diagram; thus many of the components depicted in FIG. 18 may be realized by common constructs or distributed among additional physical components. Moreover, it is certainly contemplated that other existing and yet-to-be developed physical components and architectures may be utilized to implement the functional components described with reference to FIG. 18.

The display 1812 generally operates to provide a presentation of content to a user, and may be realized by any of a variety of displays (e.g., CRT, LCD, HDMI, micro-projector and OLED displays). And in general, the nonvolatile memory 1820 functions to store (e.g., persistently store) data and executable code including code that is associated with the functional components depicted in FIG. 1. In some embodiments for example, the nonvolatile memory 1820 includes bootloader code, modem software, operating system code, file system code, and code to facilitate the implementation of one or more portions of the compiler front end 108, detection component 110, the parallel-merging component 112, compiler/interpreter 114, and execution component 116 discussed in connection with FIG. 1 as well as other components well known to those of ordinary skill in the art that are not depicted nor described in connection with FIG. 1 for simplicity.

In many implementations, the nonvolatile memory 1820 is realized by flash memory (e.g., NAND or ONENAND memory), but it is certainly contemplated that other memory types may be utilized as well. Although it may be possible to execute the code from the nonvolatile memory 1820, the executable code in the nonvolatile memory 1820 is typically loaded into RAM 1824 and executed by one or more of the N processing components 1826.

The N processing components 1826 in connection with RAM 1824 generally operate to execute the instructions stored in nonvolatile memory 1820 to effectuate the functional components depicted in FIG. 1. For example, a code cache of the compiler/interpreter 114 may reside in RAM 1824 and compiled code may be executed by one or more of the N processing components 1826. As one of ordinarily skill in the art will appreciate, the N processing components 1826 may include an application processor, a video processor, modem processor, DSP, graphics processing unit (GPU), and other processing components.

The transceiver component 1828 includes N transceiver chains, which may be used for communicating with the network 102 described with reference to FIG. 1. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A content processing device comprising:
   a compiler front end to parse source code into a high level intermediate representation of the source code;
   a detection component to detect high level constructs in the high level intermediate representation of the source code that satisfy constraints for parallel-merging high level constructs; and
   a parallel-merging component that modifies the high level intermediate representation of the source code by parallel-merging the detected high level constructs to generate new parallel-merged high level constructs in a modified high level intermediate representation of the source code that enable runtime operations of the detected high level constructs to execute in parallel using executable code generated from the modified high level intermediate representation, and if the parallel execution of the runtime operations causes an error, execution is carried out using executable code generated from unmodified representations of the detected constructs so the operations of the detected constructs execute sequentially during runtime.

2. The content processing device of claim 1, wherein the constraints for parallel-merging high level constructs include the detected high level constructs that would ordinarily consecutively execute, after being lowered into low level operations, and have control flow paths that are equivalent in structure and function, and execution traces through the control flow paths in each of the lowered control flow regions are the same.

3. The content processing device of claim 1, wherein the constraints for parallel-merging include two or more different high level constructs which when lowered individually expand to pure linear code.

4. The content processing device of claim 1, wherein the constraints for parallel-merging include two or more different high level constructs, where one of the different high level constructs when lowered individually generates a control flow region and others of the different high level constructs when lowered individually generate pure linear code.

5. The content processing device of claim 1, wherein the constraints for parallel-merging include two or more different high level constructs, that when lowered into control flow regions, include a distinct straight line sequential code through which a control flow path must pass.

6. The content processing device of claim 1, including a library of known context types accessible by the detection component, each of the context types identifies a set of specific high level constructs with their connectivity pattern and constraints and defines a signature of a feasible parallel-merge candidate.

7. The content processing device of claim 1, including a runtime profile component that records control flow paths taken by executable code that correspond to the high level constructs that are candidates for parallel-merging.

8. The content processing device of claim 1, wherein the high level intermediate representation of the source code includes one of an abstract syntax tree (AST) or a control flow graph (CFG).

9. The content processing device of claim 1, wherein the source code includes one of JavaScript, Java, or other dynamically typed programming/scripting languages where specific bounds and condition checks are an inherent part of the language, and parallel merging includes merging the two or more control flow regions that are exactly same in structure and function, and the control flow path taken through each of the control flow regions during runtime is the same.

10. The content display device of claim 1, wherein the parallel merging includes:
    merging constructs with pure linear code in a lowered form merging to a most frequently taken control flow path in the control flow region obtained by lowering for a single construct; and
    providing fail-safe error correction support for instances when the most frequently taken control flow path is not taken.

11. The content display device of claim 1, wherein the parallel merging includes partial merging of high level constructs wherein all high level constructs get lowered into control flow regions with a distinct straight line code sequence through which control flow must pass have the straight line code sequence parallel-merged either partially or fully.

12. The content display device of claim 1 including an optimized compiler and new rules for lowering the parallel-merged high level constructs from the high level intermediate representation to a low level intermediate representation.

13. The content display device of claim 12, wherein the new rules for a particular parallel-merged high level construct generates a parallel merged control flow region by doing one-by-one aggregation of the low level operations leading to the presence of multiple same low level operations in the low level intermediate representation side-by-side as equal to a number of similar high level constructs parallel-merged.

14. The content display device of claim 1, including a non-optimized compiler and new templates for lowering the parallel-merged high level constructs from the high level intermediate representation to direct assembly code.

15. The content display device of claim 14, wherein the new templates for a particular parallel-merged high level construct generate a parallel merged control flow region by doing one-by-one aggregation of the low level operations to create a presence of multiple same assembly instructions in assembly code side by side as equal to the number of similar high level constructs parallel-merged.

16. The content display device of claim 1, including a converter for lowering the parallel-merged high level constructs from the high level intermediate representation to interpreter engine formatted code.

17. A method for processing source code comprising:
    receiving source code;
    parsing the source code to obtain a high level intermediate representation of the source code;
    detecting, in the high level intermediate representation of the source code, high level constructs in the high level intermediate representation of the source code that satisfy constraints for parallel-merging high level constructs; and
    parallel-merging the high level constructs to generate new high level parallel-merged constructs in a modified high level intermediate representation of the source code that enable runtime operations of the high level constructs to execute in parallel using executable code generated from the modified high level intermediate representation; and
    executing, if the parallel execution of the runtime operations causes an error, executable code generated from unmodified representations of the high level constructs so the runtime operations of the high level constructs execute sequentially during runtime.

18. The method of claim 17 wherein parsing maintains atomic constructs of a programming language of the source code, including property read/writes, array read/writes, and JavaScript binary operations with in-built type checking.

19. The method of claim 17, wherein the constraints for parallel-merging high level constructs includes determining that the high level constructs would ordinarily consecutively execute, after being lowered into executable code, as control flow paths that are equivalent in structure and function, and execution traces through the control flow paths in a control flow region of each of the lowered constructs are the same.

20. The method of claim 17, wherein the constraints for parallel-merging high level constructs include two or more different high level constructs which when lowered individually expand to pure linear code.

21. The method of claim 17, wherein the constraints for parallel-merging high level constructs includes two or more different high level constructs, where one of the high level constructs when lowered individually generates a control flow region and others of the high level constructs when lowered individually generate pure linear code.

22. The method of claim 17, wherein the constraints for parallel-merging high level constructs include a determination that two or more different high level constructs, when lowered, include a distinct straight line sequential code through which a control flow path must pass.

23. The method of claim 17, wherein the parallel execution includes one or more of VLIW, multiple-issue/dispatch superscalar, SIMD and vectorized execution.

24. The method of claim 17 including:
accessing a library of known context types, wherein a context type identifies a set of specific high level constructs with their connectivity pattern and constraints and defines a signature of a parallel-merge candidate.

25. The method of claim 17, including:
obtaining runtime profile information; and
recording control flow paths taken by executable code that correspond to the high level constructs that are candidates for parallel-merging.

26. The method of claim 17, wherein detecting includes assessing a compiler high level intermediate representation including one of an abstract syntax tree and a control flow graph that is generated during parsing.

27. The method of claim 17, wherein the parallel-merging includes enabling vectorization, forming VLIW packets, or plainly exploiting multiple issue/dispatch of a superscalar RISC processor of the operations executed in parallel.

28. The method of claim 17, wherein parallel-merging includes:
merging constructs that are pure linear code in their lowered form to a most frequently taken control flow path in a control flow region for the single construct that when lowered is a control flow region; and
providing fail-safe error correction support for instances when the most frequently taken control flow path is not taken.

29. The method of claim 17, wherein parallel-merging includes merging constructs where all constructs that get lowered either partly or fully into a distinct straight line code sequence, have a straight line code sequence parallel-merged either partially or fully.

30. The method of claim 17, including lowering the parallel-merged high level constructs from the high level intermediate representation to a low level intermediate representation according to new rules.

31. The method of claim 17, including lowering the parallel-merged high level constructs from the high level intermediate representation to direct assembly code using new templates.

32. The method of claim 17, including lowering the parallel-merged high level constructs from the high level intermediate representation to interpreter engine formatted code.

33. A content processing device comprising:
means for receiving source code;
means for parsing the source code to obtain a high level intermediate representation of the source code;
means for detecting, in the high level intermediate representation of the source code, constructs in the high level intermediate representation of the source code that satisfy constraints for parallel-merging high level constructs; and
means for parallel-merging the high level constructs to generate new high level parallel-merged constructs in a modified high level intermediate representation of the source code that enable runtime operations of the high level constructs to execute in parallel using executable code generated from the modified high level intermediate representation; and
means for executing, if the parallel execution of the runtime operations causes an error, executable code generated from unmodified representations of the high level constructs so the runtime operations of the detected constructs execute sequentially during runtime.

34. The content processing device of claim 33, wherein the constraints for parallel-merging high level constructs includes determining that the high level constructs would ordinarily consecutively execute, after being lowered into executable code, as control flow paths that are equivalent in structure and function, and execution traces through the control flow paths in a control flow region of each of the lowered constructs are the same.

35. The content processing device of claim 33, wherein the constraints for parallel-merging high level constructs include two or more different high level constructs which when lowered individually expand to pure linear code.

36. The content processing device of claim 33, wherein the constraints for parallel-merging high level constructs include two or more different high level constructs, where one of the high level constructs when lowered individually generates a control flow region and others of the high level constructs when lowered individually generate pure linear code.

37. The content processing device of claim 33, wherein the constraints for parallel-merging high level constructs include a determination that two or more different high level constructs, when lowered, include a distinct straight line sequential code through which a control flow path must pass.

38. A non-transitory, tangible computer readable storage medium, encoded with processor readable instructions to perform a method for processing source code, the method comprising:
receiving source code;
parsing the source code to obtain a high level intermediate representation of the source code;
detecting, in the high level intermediate representation of the source code, high level constructs in the high level intermediate representation of the source code that satisfy constraints for parallel-merging high level constructs; and
parallel-merging the high level constructs to generate new high level parallel-merged constructs in a modified high level intermediate representation of the source code that enable runtime operations of the high level constructs to execute in parallel using executable code generated from the modified high level intermediate representation; and
executing, if the parallel execution of the runtime operations causes an error, executable code generated from unmodified representations of the high level constructs so the runtime operations of the high level constructs execute sequentially during runtime.

39. The non-transitory, tangible computer readable storage medium of claim 38, wherein the parsing maintains atomic constructs of a programming language of the source code, including property read/writes, array read/writes, JavaScript binary operations with in-built type checking, as atomic components in the high level intermediate representation.

40. The non-transitory, tangible computer readable storage medium of claim 38, wherein the constraints for parallel-merging high level constructs includes determining that the high level constructs would ordinarily consecutively execute, after being lowered into executable code, as control flow paths that are equivalent in structure and function, and execution traces through the control flow paths in a control flow region of each of the lowered constructs are the same.

41. The non-transitory, tangible computer readable storage medium of claim 38, wherein the constraints for parallel-merging high level constructs include two or more different high level constructs which when lowered individually expand to pure linear code.

42. The non-transitory, tangible computer readable storage medium of claim 38, wherein the constraints for parallel-merging high level constructs include two or more different high level constructs, that when lowered, include a distinct straight line sequential code through which control flow path must pass.

43. The non-transitory, tangible computer readable storage medium of claim 38, wherein the method includes:
    accessing a library of known context types, wherein a context type identifies a set of specific high level constructs with their connectivity pattern and constraints and defines a signature of a parallel-merge candidate.

44. The non-transitory, tangible computer readable storage medium of claim 38, wherein the method includes:
    obtaining runtime profile information; and
    recording control flow paths taken by executable code that correspond to high level constructs that are candidates for parallel-merging.

45. The non-transitory, tangible computer readable storage medium of claim 38, wherein detecting includes assessing a compiler high level intermediate representation including one of an abstract syntax tree and a control flow graph that is generated during parsing.

46. The non-transitory, tangible computer readable storage medium of claim 38, the method including lowering the parallel-merged high level constructs from the high level intermediate representation to a low level intermediate representation according to new rules.

47. The non-transitory, tangible computer readable storage medium of claim 38, the method including lowering the parallel-merged high level constructs from the high level intermediate representation to direct assembly code using new templates.

48. The non-transitory, tangible computer readable storage medium of claim 38, the method including lowering the parallel-merged high level constructs from the high level intermediate representation to interpreter engine formatted code.

* * * * *